Aug. 6, 1935.   H. R. GEER   2,010,662
PROFILING MACHINE
Filed July 22, 1933   11 Sheets-Sheet 1

Inventor
*Harry R. Geer.*
By *R. S. A. Dougherty*
Attorney

Aug. 6, 1935.  H. R. GEER  2,010,662
PROFILING MACHINE
Filed July 22, 1933   11 Sheets-Sheet 4

Inventor
*Harry R. Geer.*

By *R. S. C. Dougherty*
Attorney

Aug. 6, 1935.  H. R. GEER  2,010,662
PROFILING MACHINE
Filed July 22, 1933  11 Sheets-Sheet 5

Inventor
Harry R. Geer.
By R. S. A. Dougherty.
Attorney

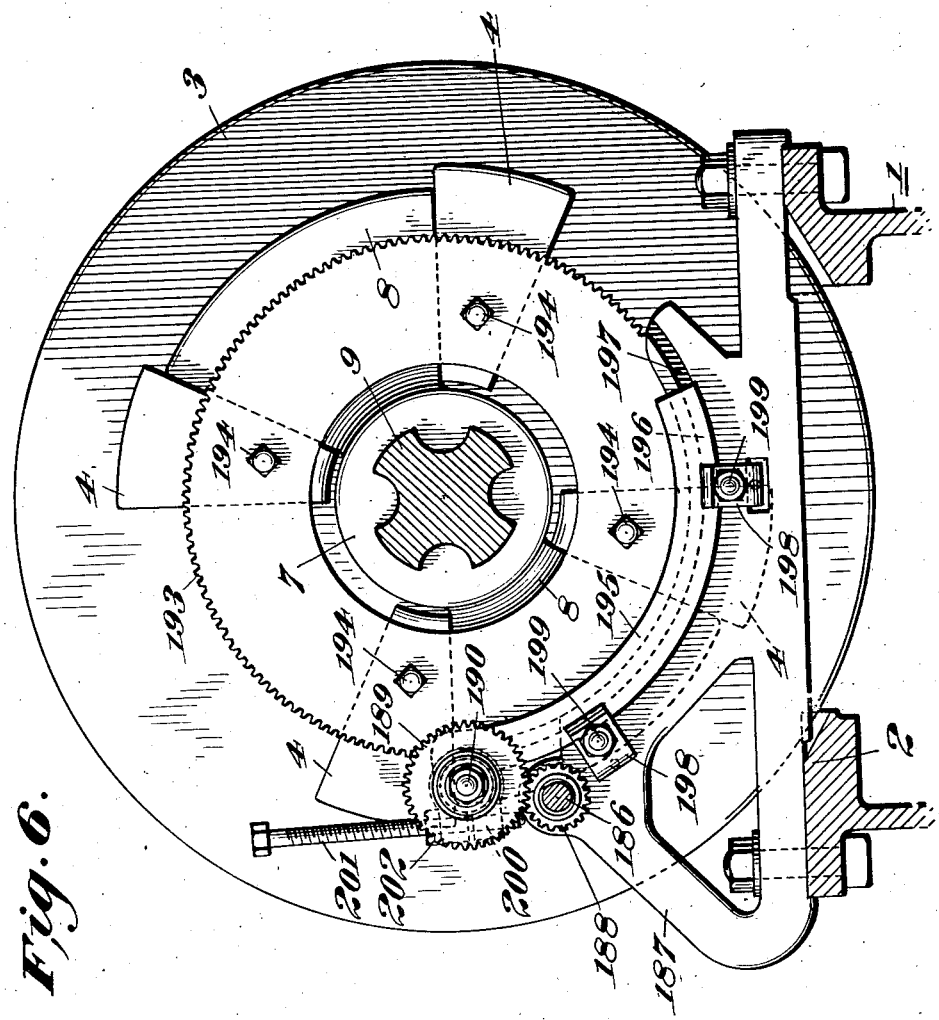

Aug. 6, 1935.  H. R. GEER  2,010,662
PROFILING MACHINE
Filed July 22, 1933  11 Sheets-Sheet 7
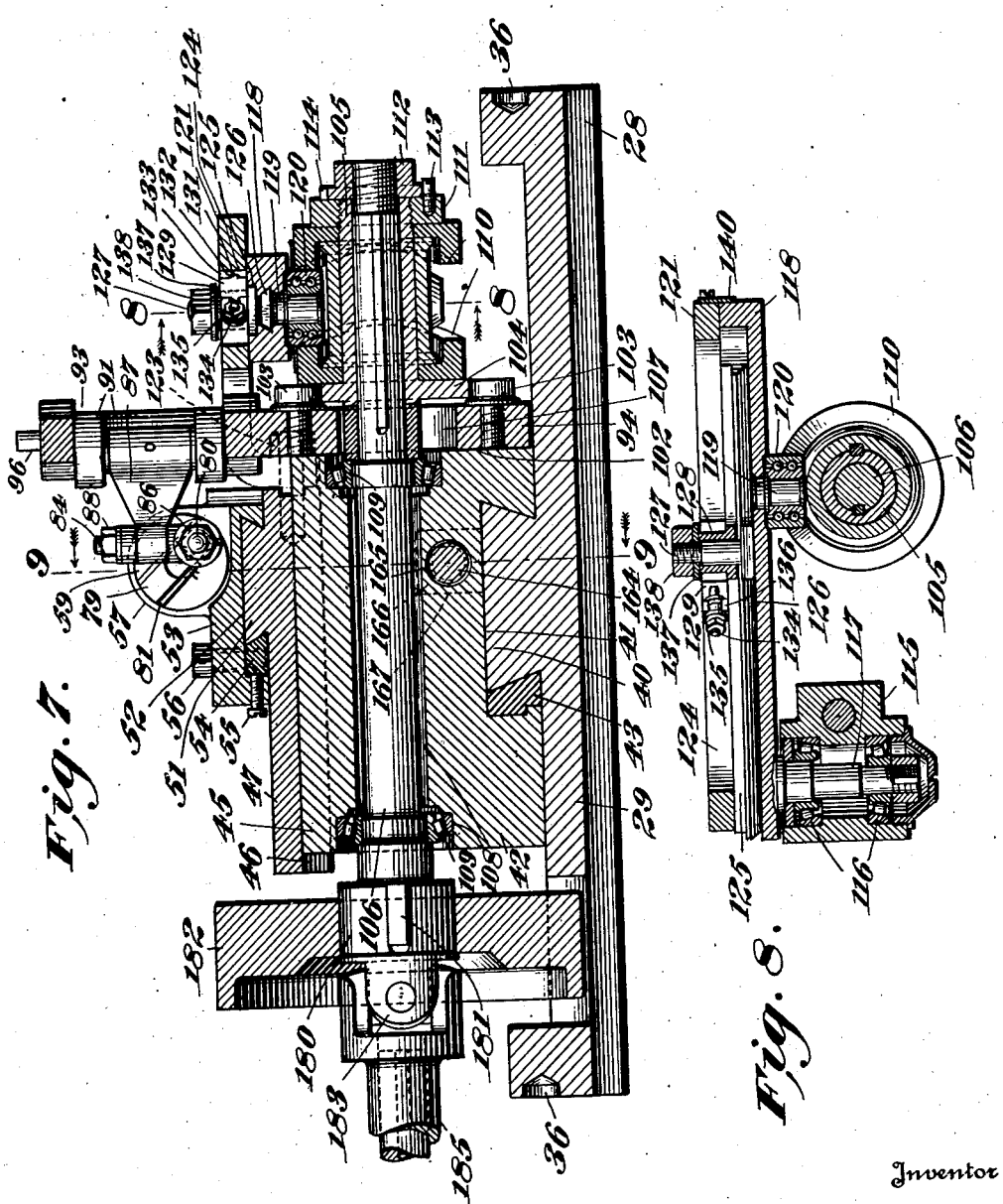
Inventor
Harry R. Geer.
By R. S. A. Dougherty.
Attorney Aug. 6, 1935.    H. R. GEER    2,010,662
PROFILING MACHINE
Filed July 22, 1933    11 Sheets-Sheet 8
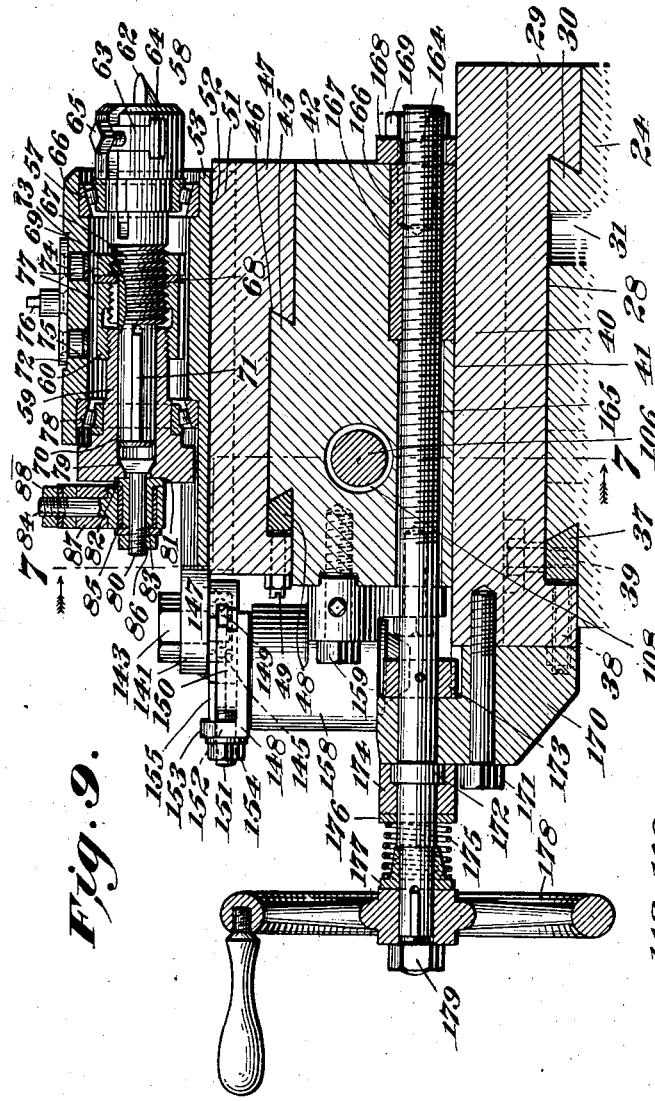
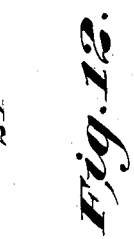
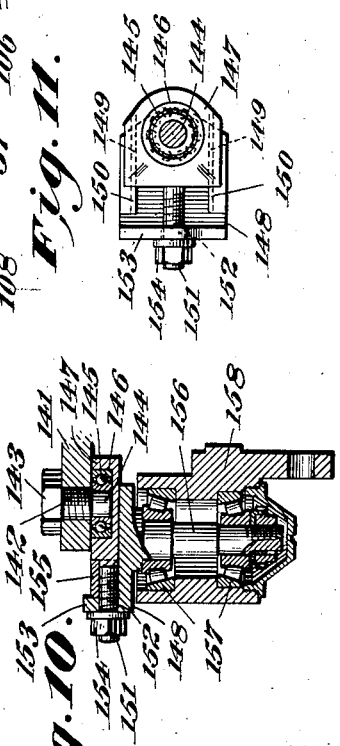
Inventor
*Harry R. Geer.*
By *R. S. C. Dougherty.*
Attorney.

Aug. 6, 1935.   H. R. GEER   2,010,662
PROFILING MACHINE
Filed July 22, 1933   11 Sheets-Sheet 9
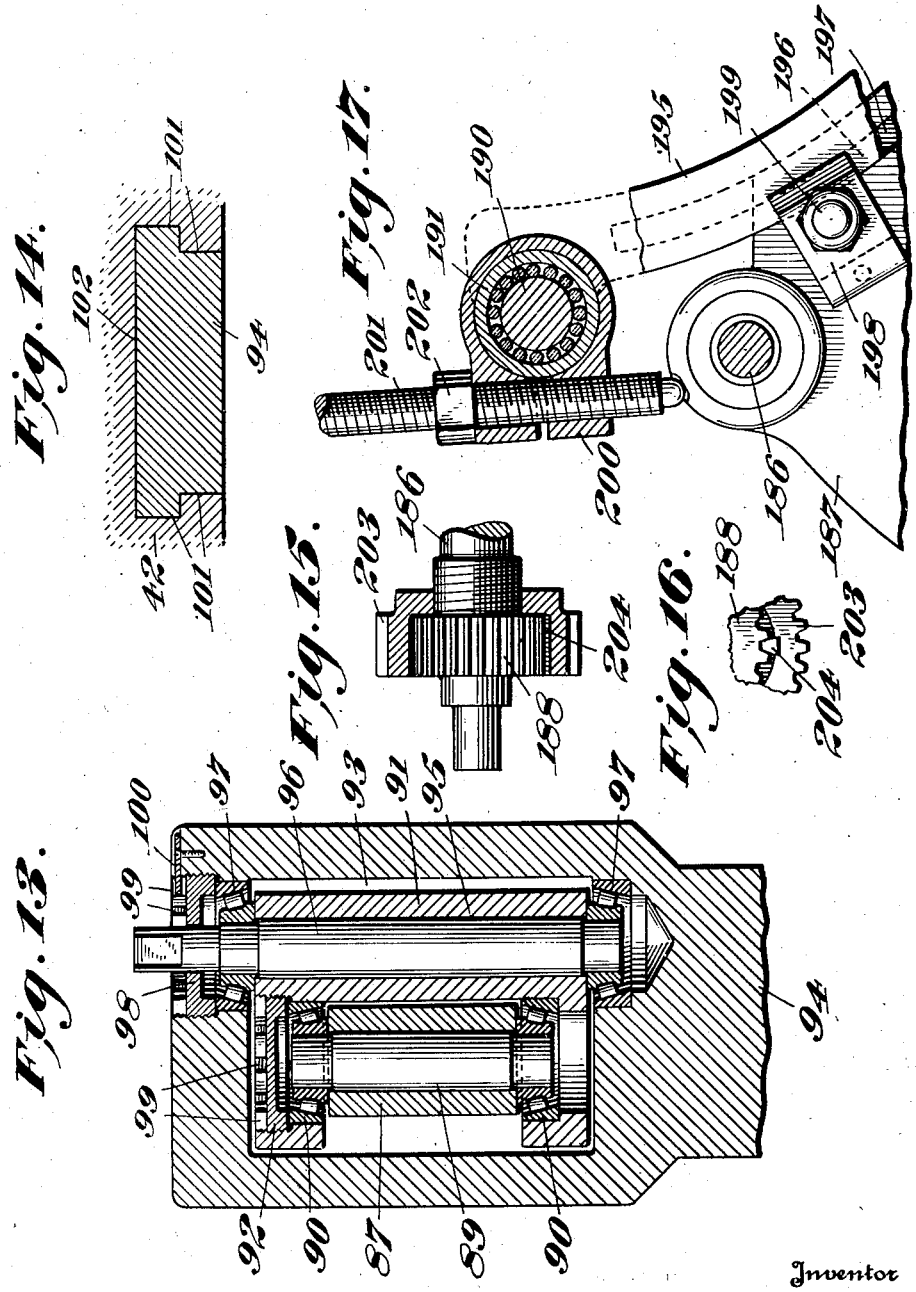
Inventor
Harry R. Geer:
By R. S. A. Dougherty.
Attorney Aug. 6, 1935.  H. R. GEER  2,010,662
PROFILING MACHINE
Filed July 22, 1933  11 Sheets-Sheet 10
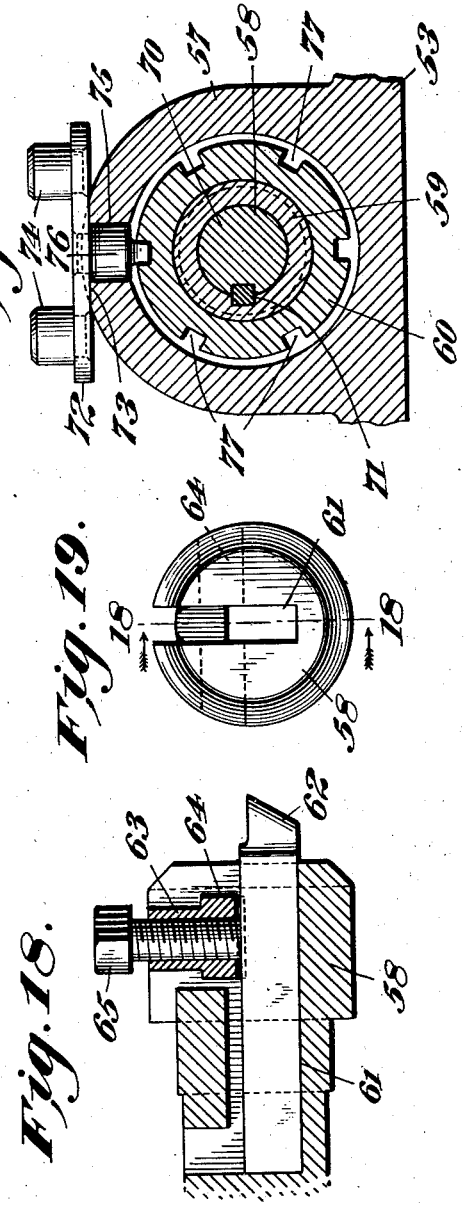
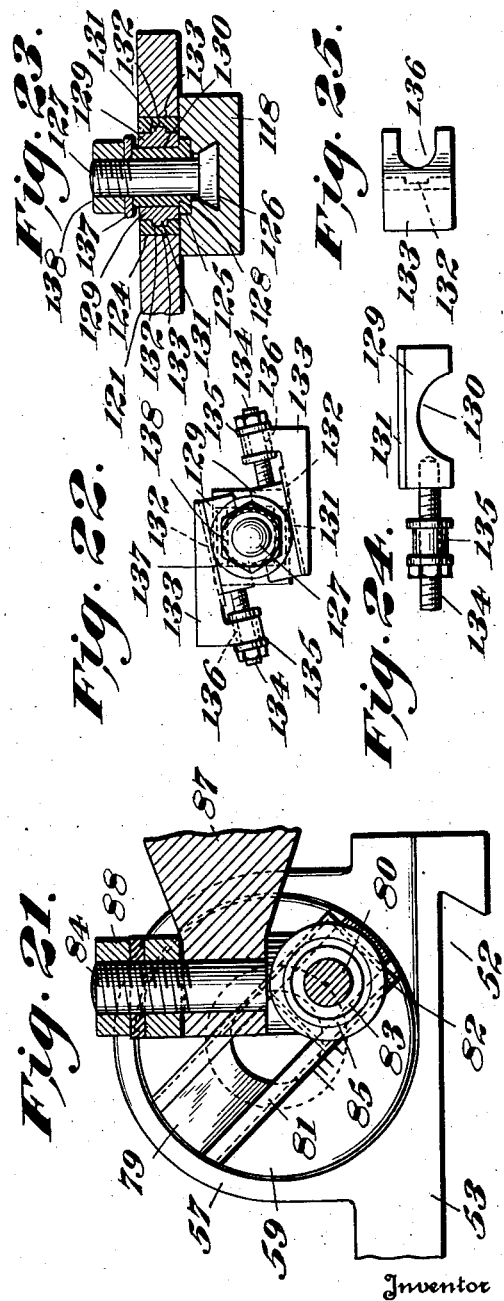
Inventor
*Harry R. Geer.*
By *P. S. A. Dougherty.*
Attorney

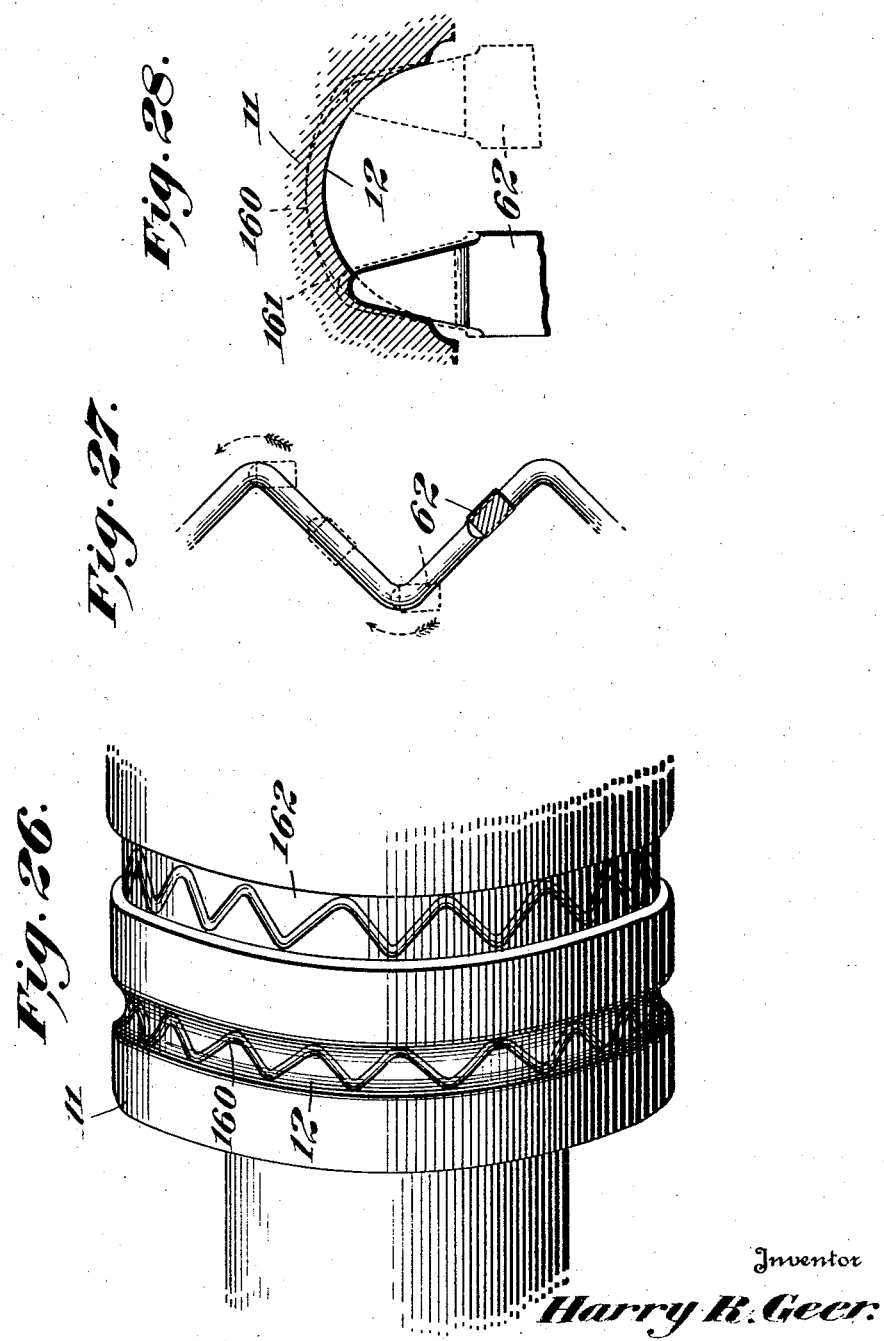

Patented Aug. 6, 1935

2,010,662

UNITED STATES PATENT OFFICE 2,010,662

PROFILING MACHINE

Harry R. Geer, Westmont, Pa., assignor to Bethlehem Steel Company, a corporation of Pennsylvania Application July 22, 1933, Serial No. 681,701

52 Claims. (Cl. 82—19)

My invention relates to profiling machines and more especially to a device for forming zig-zag grooves in roll passes or in the cylindrical face of a plain finishing roll.

One of the objects of my invention relates to the manner of adjusting the stroke of the top tool carriage-block which carries the cutting tool so that it may be reciprocated longitudinally in a plane at the side of the roll thereby enabling the cutting-tool to travel different distances to correspond with the width of the roll pass or in the case of a plain faced roll any desired height of a zig-zag groove that may be desired.

Another object of my invention relates to the mechanism for holding the tool with its cutting face at a fixed angle in its mounting during the reciprocation of the top tool carriage block and for automatically rotating the cutting-tool in one direction at the end of the forward stroke of the said top tool carriage block and for automatically rotating the cutting-tool in the reverse direction at the end of the backward stroke of the same, in such a manner that the cutting face of the tool will always be held transversely to the line of the groove cut and in radial alignment with the center of the roll.

Another object of my invention relates to the mechanism for adjusting the rotary movement of the cutting-tool at the end of each stroke of the top tool carriage-block.

A further object of my invention is to provide means for giving the cutting end of the tool an arc shaped path during the reciprocating strokes of the top tool carriage-block.

A further object of my invention is to provide means for adjusting the radii of the arc described by the cutting tool.

A further object is to form the bearings and slide-ways for the several parts so they can be quickly adjusted to take up any lost motion which may occur.

A further object of my invention relates to the manner of mounting the tool carriage base on the rest-bar so that it can be quickly adjusted in any desired position in front of the roll to be operated upon.

Still another object relates to the mechanism by means of which the number of zig-zag waves for each revolution of the roll may be varied and governed.

With the foregoing and other objects in view my invention comprises the novel construction, combination and arrangement of parts hereinafter more specifically described and illustrated in the accompanying eleven sheets of drawings which form a part of this specification and in which like characters of reference indicate like parts.

Fig. 6 is a vertical transverse section taken on the line 6—6 of Fig. 1.

Fig. 7 is a vertical longitudinal section taken on the line 7—7 of Fig. 9.

Fig. 8 is a vertical transverse section taken on the line 8—8 of Fig. 7.

Fig. 9 is a vertical transverse section through the machine taken on the line 9—9 of Fig. 7.

Fig. 10 is a detail vertical section showing the manner of mounting the mast and radius-blocks, taken on the line 10—10 of Fig. 4.

Fig. 11 is a top plan view of the mast and radius-blocks.

Fig. 12 is a detail view of one of the shims used in adjusting the radius-block.

Fig. 13 is a detail vertical section through the top of the slide taken on the line 13—13 of Fig. 4.

Fig. 14 is a detail transverse section through the slide taken on the line 14—14 of Fig. 5.

Figs. 15 and 16 are details illustrating the manner of attaching and mounting a ring-gear over the pinion mounted on the driving-spindle.

Fig. 17 is a detail of the split collar and clamping screw which is secured to the cylindrical casing of the bearing for the change-gear shaft.

Fig. 18 is a detail vertical section through the tool holder head taken on the line 18—18 of Fig. 19.

Fig. 19 is a front elevation of the tool holder head.

Fig. 20 is a detail section through a portion of the tool post bracket taken on the line 20—20 of Fig. 5, illustrating the manner of applying and holding the coupling by means of a key when it is desired to adjust the tool holder and coupling-spindle.

Fig. 21 is a detail illustrating the manner of connecting the crank-arm to the coupling-spindle.

Fig. 22 is a detail showing in top plan the clamping-bolt, wedge-block and bearing-blocks, which are mounted on the swinging-arm and form a fulcrum point thereon.

Fig. 23 is a detail vertical section through the fulcrum point for the swinging-arm and bracket taken on the line 23—23 of Fig. 5.

Fig. 24 is a detail view of one of the bearing-blocks.

Fig. 25 is an end elevation of one of the wedge-blocks.

Fig. 26 is a perspective view of a portion of a roll showing a flat and an arc shaped roll pass formed therein.

Figure 1:
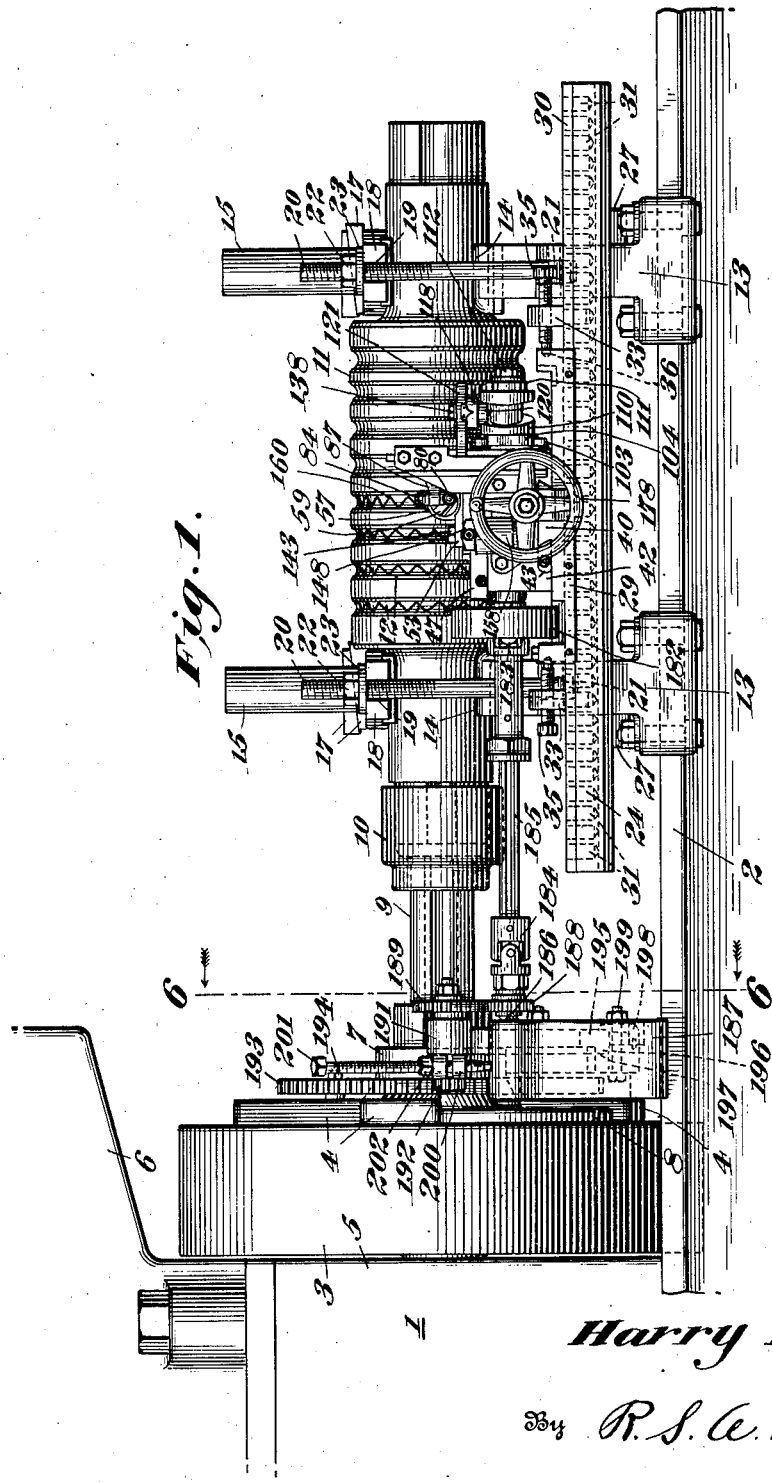
Fig. 1 is a front elevation of my invention illustrating it in the position it will assume in cutting zig-zag grooves in roll passes with enough of a standard machine shop engine lathe to show its application thereto.

Fig. 27 is a diagrammatic view illustrating the position the cutting-tool will assume in forming a zig-zag groove and Fig. 28 is a section through a portion of an arc-shaped roll pass illustrating in dotted lines the depth of the zig-zag groove when the cutting-tool is adjusted to travel in a path concentric with the sides of the roll pass, and another groove when the tool is adjusted to travel in an arc of greater radius than the sides of the roll pass.

Referring now to the drawings in detail, the numeral 1 indicates a machine shop engine lathe, 2 the lathe bed, 3 the lathe head, 4 lugs on the face of the lathe head forming a chuck for holding the work to be turned, 5 the head stand upon which the motor 6 is mounted and adapted to be connected by means of gearing (not shown) with the spindle of the lathe head in the usual well known manner. A thimble 7 extends outwardly from the center of the lathe head having flanged feet 8 which are held between the lugs 4 of the chuck. The thimble 7 is adapted to receive one end of a coupling shaft 9, to which it is keyed, while the opposite end of said shaft is connected and keyed to a coupling 10, and one end of one of the necks of the roll 11, to be operated upon, said roll having passes formed therein as at 12. Spaced housings 13 are secured by means of bolts to the lathe bed 2, each having a journal bearing mounted thereon, as at 14, for receiving the intermediate portions of the necks of the roll which are adapted to rotate thereon during the turning and grooving operations.

A post 15, extends upwardly from the back end of each of the housings, each of said posts having a plurality of perforations formed therein as at 16, adapted to receive one or more keys 17 for holding the rear ends of the bearing arms 18 for engaging the tops of the roll necks above the journal bearings 14. The forward ends of the bearing arms 18 are bifurcated as at 19 to receive the threaded ends of eye bolts 20, said eye bolts being pivoted at their lower ends as at 21 to the housing 13. The threaded ends of the eye bolts each have a nut 22 and washer 23 for engaging the top surface of the outer ends of the bearing arms for holding them in position.

The above mentioned details of the lathe and the manner of mounting the roll for turning are of well known standard construction and a further description of the same is not considered necessary.

Mounted on the housings 13 and connecting them together is a rest-bar 24, having a T-shaped slot 25 formed therein on its under side extending longitudinally thereof for receiving the heads of bolts 26 for adjustably attaching the rest bar to the flanges 27 that extend laterally from the sides of the housings. Extending upwardly and longitudinally from the central top face of the rest-bar into a groove 28 in the bottom of the tool carriage base 29 is a dovetailed tongue 30 adapted to form a slideway for the tool carriage base. Sockets are formed in the top surface of the slideway as at 31 to receive the shanks 32 of removable lugs 33, the heads of said lugs have threaded eyes formed therein as at 34 for receiving adjusting bolts 35 the ends of which are reduced and adapted to extend into sockets 36 in either end of the tool carriage base 29. In order to allow for wear and to insure a tight fit at all times between the tool carriage base 29 and the tongue 30, a liner 37 is inserted at one side thereof between the same which can be adjusted by means of set bolts 38 and 39. A transverse dovetailed tongue 40 projects upwardly from the central top surface of the tool carriage base for engaging the groove 41 in the bottom of an intermediate tool carriage block 42 and forms a slideway therefor and is provided with a tapered liner 43, which is adjustable by means of a bolt 44. The intermediate tool carriage block is provided on its upper face with a projecting longitudinal dovetailed slide-way 45 which extends into a groove 46 formed in the lower surface of the top tool carriage block 47, having a liner 48 between the same which is adjustable by means of set bolts 49 and 50. Extending transversely from the upper surface of the tool carriage block 47 near one side thereof is a dovetailed slide-way 51 which extends into a groove 52 formed in the lower surface of the tool post bracket 53 and is provided with a liner 54 between the same which is adjustable by means of set bolts 55 and 56.

The tool post bracket 53 is provided with a tubular upwardly extending portion 57 for receiving the tool holder 58 and a tubular coupling-spindle 59, the two being connected together by means of a coupling 60. The head of the tool holder projects beyond the inner end of the tubular extending portion 57 and is provided with a socket 61 for receiving the cutting-tool 62 secured in position by means of a T-shaped clamping block 63 which is inserted in a similar shaped groove 64 extending transversely in the head of the tool holder and the parts are held in position by means of a clamping screw 65. The tool holder 58 is rotatably mounted in a Timken roller bearing 66 and is provided with a screw threaded intermediate portion as at 67 for receiving one end of the coupling 60 and also for receiving a lock washer 68 which is keyed thereto and a lock nut 69, and a reduced end portion 70 extending into the tubular inner end of the coupling-spindle 59 to which it is keyed as at 71.

In adjusting the tool holder 58 and coupling-spindle 59 a key 72 is used which is mounted on a flattened surface 73 formed on top of the tubular extension 57. This key 72 has spaced pin projections 74 on one side thereof adapted to extend into perforations 75 formed in the tubular portion 57, when not in use. A stud 76 projects centrally from the opposite side of the key having a flattened upper end adapted to engage one of the serrations 77 formed in the periphery of the coupling 60 and in the lock-nut 69. This key will normally be mounted on the machine in the position it is shown in Fig. 9, when it is desired at any time to adjust the tool-holder 58 or coupling-spindle 59, it is taken off and turned over and the end of the stud 76 inserted through one of the perforations 75 into engagement with one of the serrations 77 to hold the coupling 60 or lock nut 69 from turning while allowing the tool-holder 58 or coupling-spindle 59 to be adjusted by hand as desired as will be clearly understood by referring to Fig. 20 of the drawings. A Timken roller bearing 78 supports the intermediate portion of the tubular coupling-spindle 59, while its outer end is formed with a head extending beyond the tubular portion 57, having a dovetailed slot 79 formed transversely therein for engaging the inclined sides of a square headed bolt 80 which is inserted therein with the shank of the bolt extending outwardly therefrom beyond the outer end of the coupling-spindle 59. The front face of the coupling-spindle 59 is grooved as at 81 to receive the rectangular flanged end 82 of a sleeve 83 mounted on the intermediate portion of the bolt 80 upon which is rotatably mounted an eye-bolt 84. The inner surface of the eye of this bolt is provided with a bushing as at 85, the parts being adjustable on the head of the spindle-coupling and retained in position by means of a lock-washer and nut 86 threaded on the outer end of the bolt 80. The shank of the eye-bolt 84 has one end of an arm 87 pivoted thereto and retained in position thereon by means of a nut 88 threaded on the end of the bolt, the opposite end of the arm being perforated to receive a pin 89 having extending ends journaled in Timken roller bearings 90 which are mounted in cylindrical openings formed in the bifurcated end of a yoke 91 and retained in position by an adjuster 92. The yoke 91 is mounted in an opening 93 in the upper end of a slide 94, the body of the yoke is perforated as at 95 for receiving a shaft 96, the ends of which extend beyond the top and bottom surfaces of the yoke and journaled in Timken roller bearings 97 mounted in the slide 94 and retained in position by means of an adjuster 98, both of these adjusters 92 and 98 have serrations 99 formed therein on their upper surfaces for engaging keys 100, whereby they are held in their adjusted positions. As it is sometimes desirable to hold the shaft 96 against turning when assembling and adjusting the parts, the upper end of this shaft extends through a central perforation in the adjuster 98 and projects beyond the upper end of the slide and is squared or flattened for receiving a wrench or tool for holding the same.

The lower end of the slide 94 has rabbeted side edges 101 and is mounted in a slide-way 102 formed in one end of the intermediate tool carriage block 42. A pair of spaced rollers 103 are attached to the side of the slide 94 adapted to engage the top and bottom surfaces of a cam 104 for reciprocating the slide. This cam 104 has a tubular extending portion 105 which is mounted on, and keyed to a cam-shaft 106 that extends through openings 107 and 108 in the slide 94 and intermediate tool carriage block 42 respectively, said cam-shaft being journaled in Timken roller bearings 109, one of which is seated in a socket at each end of the opening 108 formed in the intermediate tool carriage block 42. A cam 110 is mounted on the tubular extension 105 of the cam 104 and is held in clamped position by means of a nut 111 screwed on the end of the tubular extension 105 and a flanged nut 112 screwed on one end of the cam-shaft 106, the flanged nut 112 being locked in position by means of screw-threaded pins 113 engaging serrations 114 in the flange of the nut and screwed into the nut 111.

A bracket 115 is bolted to the end of the intermediate tool carriage block 42 opposite the cam 110 having Timken roller bearings mounted therein as at 116 for receiving a stub-shaft 117 formed integral with the end of a swinging-arm 118 and adapted to form a pivotal point therefor. Attached to the swinging-arm 118 at an intermediate point and extending downwardly therefrom is a stud-pin 119 having a roller 120 mounted thereon for engaging the cam 110 for actuating the same.

Figure 4:
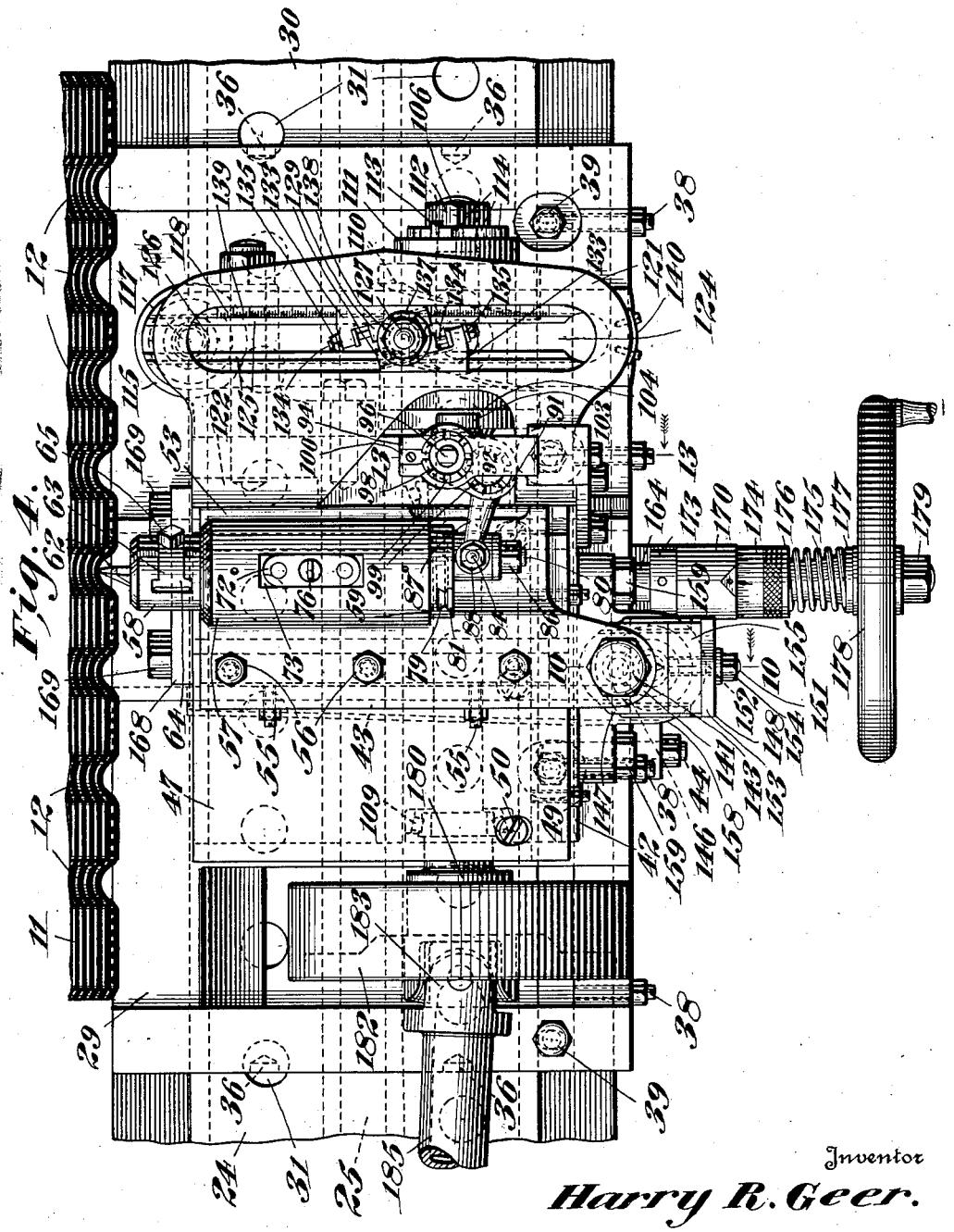
Fig. 4 is a top plan view of my invention.
Figure 5:
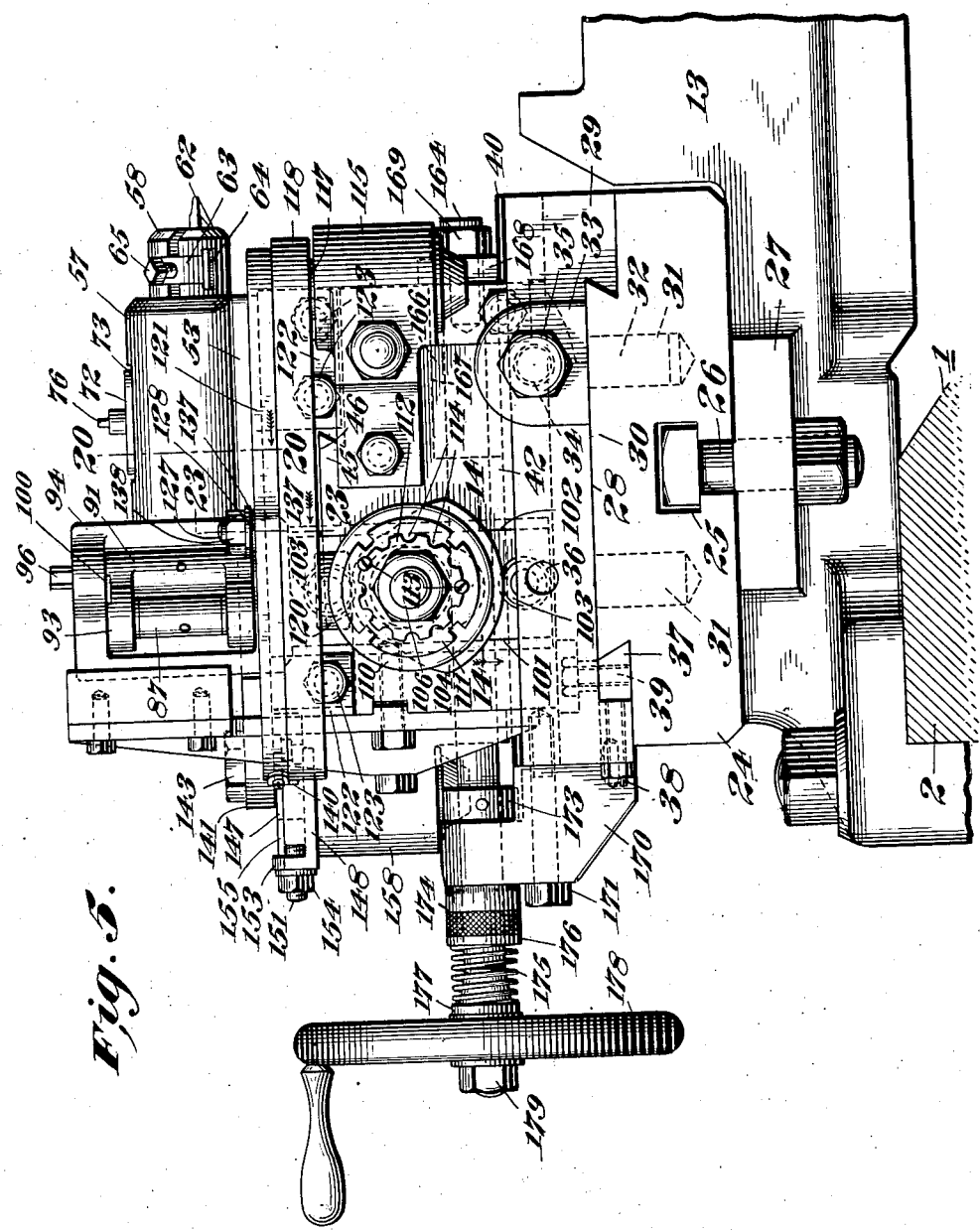
Fig. 5 is an end elevation.

A bracket 121 having its opposite ends flanged as at 122 and attached by means of bolts 123 to the same end of the intermediate tool carriage block 42 as that of the bracket 115 extends laterally over the top face of the swinging arm 118 and is slotted as at 124 to form a slide-way for receiving the blocks of an adjustable fulcrum point connection between the swinging arm 118 and the bracket 121 for reciprocating the top carriage block 47 upon which the tool post bracket 53 is mounted, the construction of which I will now describe. Slideways 125 and 126 are formed longitudinally in the swinging arm 118 which are adapted when the swinging arm is in its central position to be disposed in vertical alignment with the slot 124 formed in the bracket 121 as indicated in Fig. 4 of the drawings. The slideway 126 is dovetailed to engage the inclined sides of the rectangular head of a clamping-bolt 127, while the shank of the bolt extends upwardly therefrom through the slot 124 formed in the bracket 121 for receiving a sleeve 128 having a rectangular shaped flanged edge for adjustably engaging the slide-way 125. Mounted on the sleeve 128 on top of the swinging-arm 118 are two bearing blocks 129 each having an arc shaped side portion 130 for engaging either side of the sleeve 128, the sides of the bearing blocks are each provided centrally with a longitudinal rib 131 adapted to extend into a groove 132 on the inner faces of wedge-blocks 133, the bearing-blocks 129 are also provided with screw-threaded studs 134 for receiving flanged sleeve-nuts 135 for engaging the bifurcated ends 136 of the wedge-blocks 133, for adjusting the wedge-blocks when desired. One side of each of the wedge-blocks opposite the grooved face is made straight so that when the several parts are assembled the straight sides of the wedge-blocks will be parallel with each other and slidably engage the sides of the slot 124 formed in the bracket 121 during the reciprocation of the top tool carriage blocks 47. The upper end of the clamping-bolt 127 is screw-threaded for receiving a washer 137 and a clamping-nut 138 by means of which the sleeve 128, bearing-blocks 129, and wedge-blocks 133 are securely clamped to each other on the swinging-arm 118 and forms a fulcrum point between the same and the bracket 121. By slightly unscrewing the clamping nut 138 the fulcrum point may be adjusted on the swinging-arm 118 to give a greater or less stroke to the reciprocating top tool carriage block 47 which carries the tool post bracket 53, with the cutting tool holder 58. The swinging-arm 118 is graduated as at 139 to indicate the position of the fulcrum point thereon and a pointer 140 is attached to the front end of the bracket 121 to more easily determine the position of the swinging arm in relation thereto. When the fulcrum point is moved towards the pivotal point 117, on the swinging-arm 118 the roller 120 engaging the cam 110 will give a shorter stroke to the top tool carriage block 47, as the fulcrum point is moved farther away the stroke will be longer.

To enable the cutting tool to travel in an arc-shaped path an ear 141 extends forwardly from the base of the tool post bracket 53 having a screw-threaded hole formed therein as at 142 for receiving a bolt 143, this bolt has a reduced plain lower end 144 extending into a roller bearing 145 which is mounted in a socket 146 formed in a radius-block 147, this radius-block is adjustably mounted in a mast-block 148 and has oppositely disposed parallel sides, grooved as at 149 for receiving the inwardly extending flanged sides 150 of the mast-block. Extending forwardly from the radius-block 147 is a cylindrical screw-threaded extension 151 which passes through a perforation 152 in the front flanged face 153 of the mast-block, and a nut 154 is threaded on its outer end by means of which the radius-block is held in its adjusted position, the front end of the radius-block being adapted to be held in spaced relation with the front flanged face 153 of the mast-block 148 by means of a shim 155. Formed integral with the mast-block 148 is a shaft 156 journaled in Timken roller bearings 157 which are mounted in a bracket 158 provided with flanged edges attached to the front face of the intermediate tool carriage block 42 by means of bolts 159. The radius-block is adjusted in the following manner, if it is desired to cut a zig-zag groove which is concentric with the sides of the roll pass as indicated at 160 in Fig. 28 for a one inch bar the top tool post bracket 53 would be adjusted by means of the radius-block, so that the bolt 143 or pivotal point would be one half of an inch out of vertical alignment with the center of the mast-block shaft 156, or one half of the diameter of the bar or pass, this proportion would be proportionately the same with all sizes of roll passes, the adjustment being one half the diameter of the bar where the groove is formed concentric with the width or sides of the pass, if however it is desired to increase the radius of the cut to form a zig-zag groove having a greater depth at the apices of the groove as indicated at 161 in Fig. 28 an adjustment of a greater distance from the mast-block shaft is made, if it is desired to decrease the radius of the cut to form a groove deeper in the center of the pass than at the apices the adjustment would be less than one half the size of the bar, after the radius-block has been adjusted in the desired position the shim 155 of the proper width is inserted between the front end of the radius-block and the front flanged face 153 of the mast-block and the nut 154 on the threaded extension tightened.

When it is desired to cut zig-zag grooves in a straight face of a cylindrical roll or a flat pass as indicated by the numeral 162 in Fig. 26 the bolt 143 is removed and the tool post bracket 53 locked to the top tool carriage block 47, in this manner the point of the cutting tool will travel parallel with the side face of the roll.

Figure 2:
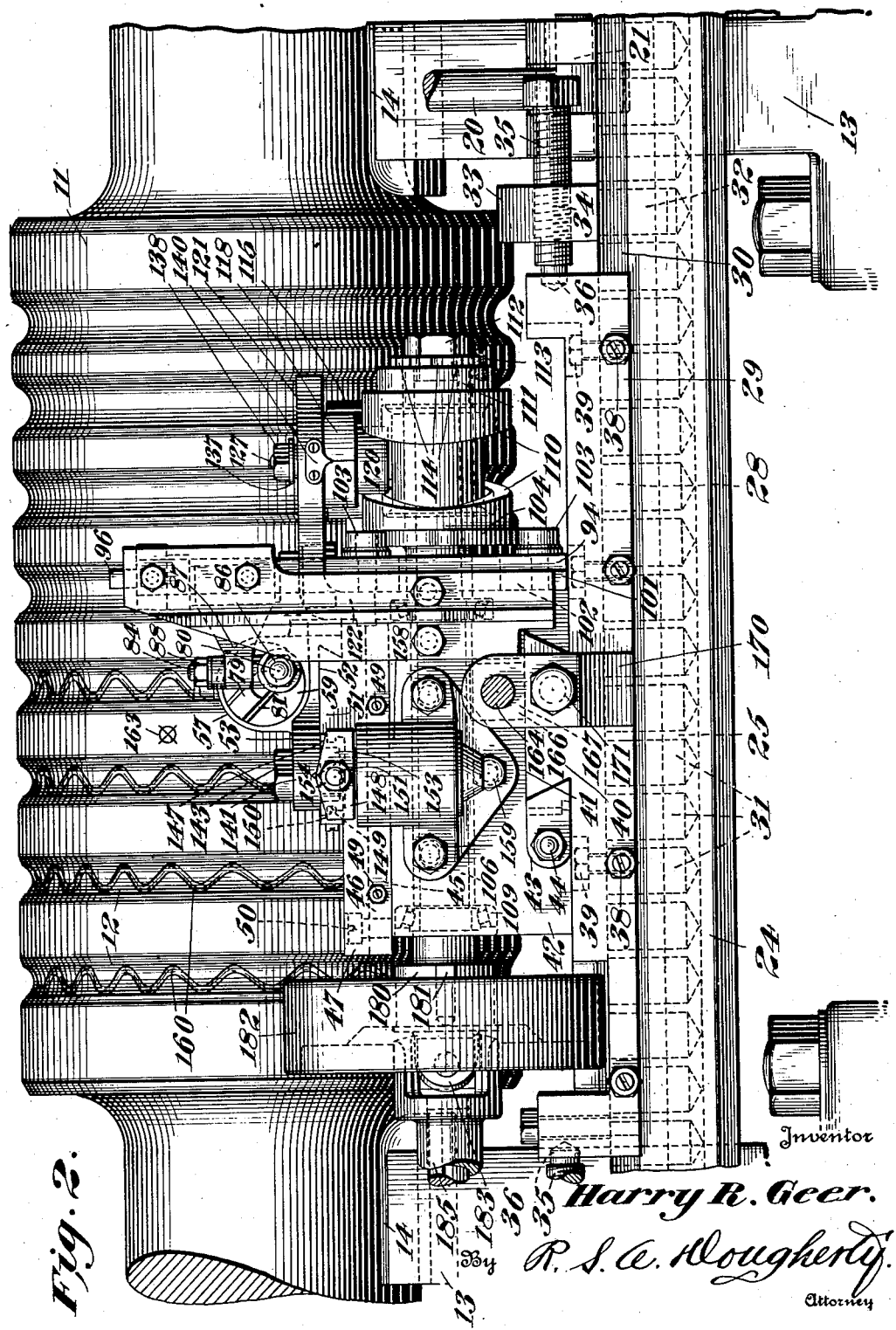
Fig. 2 is a front elevation of my invention drawn on a larger scale with the hand wheel for the feed screw removed.
Figure 3:
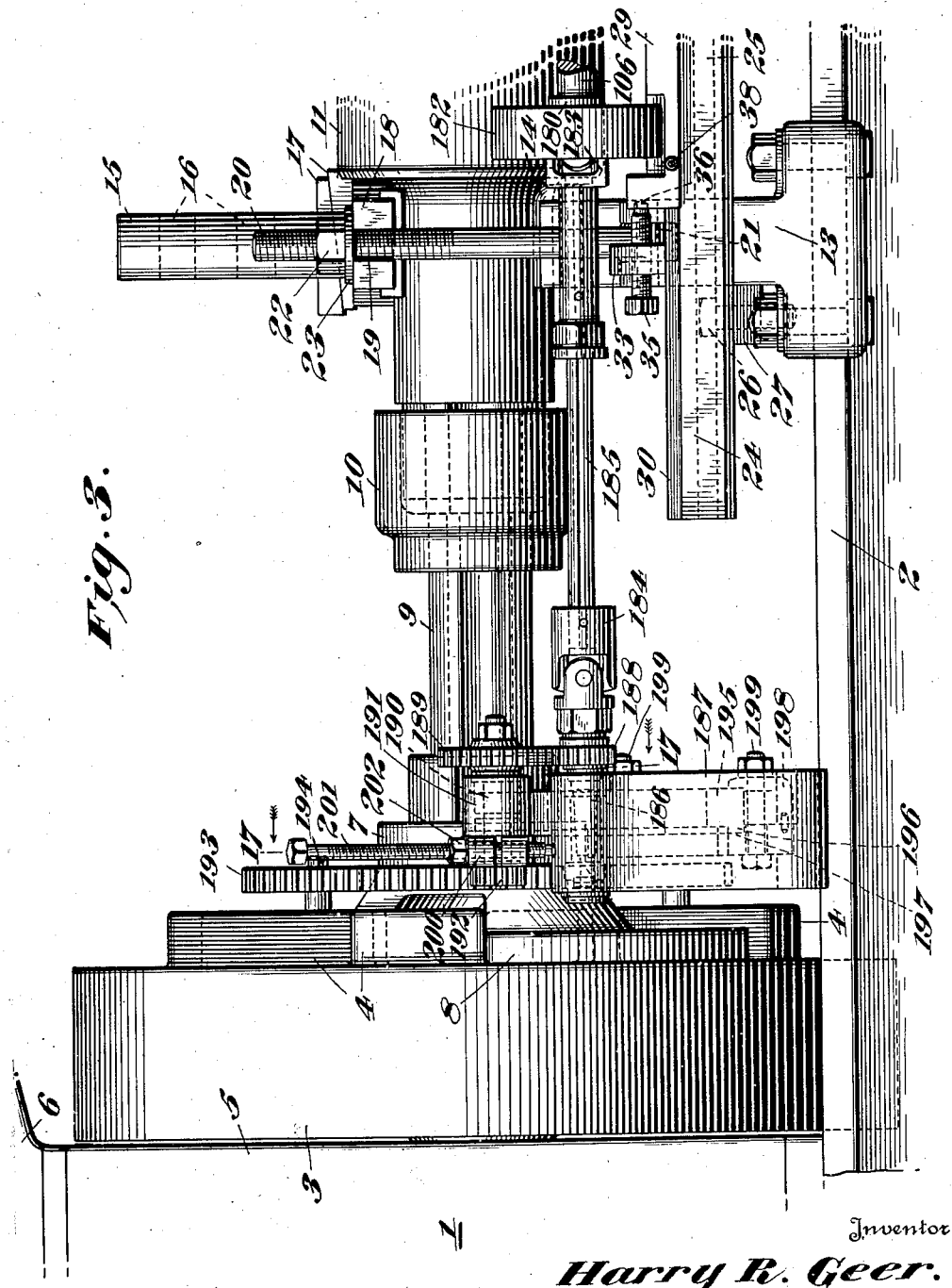
Fig. 3 is a front elevation showing the driving mechanism as applied to the lathe chuck and the coupling connections between the profiling machine and the roll to be grooved.

During the profiling operation the roll is continuously driven and the cutting tool is advanced by the operator after each revolution of the roll. A mark usually in chalk as indicated at 163 in Fig. 2 being placed on the roll opposite the roll pass so that the operator will know when each revolution is completed and the time to advance the tool, which is done by means of a feed-screw 164 which extends transversely through a perforation 165 in the intermediate tool carriage block 42 and threaded into a square shaped nut 166 seated in recess 167 formed therein and held in position by means of a keeper 168 attached to the rear face of the intermediate tool carriage block 42 by means of bolts as at 169. The feed-screw has a plain portion which is journaled in a bearing-bracket 170 attached by means of a bolt 171 to the front side face of the tool carriage base 29. In order to hold the feed-screw 164 stationary in relation to the tool carriage an abutment 172 and a collar 173 on the plain portion of the feed-screw engage opposite sides of the bearing-bracket 170. A vernier gage sleeve 174 having graduations formed thereon register with a setting mark on the bearing-bracket 170 is mounted on the feed-screw and extends over the abutment 172 and is held in position by means of a spring 175 inserted between washers 176 and 177 and a hand-wheel 178 is keyed to the outer end of the feed-screw and retained in position by means of a nut 179 threaded on the reduced outer end of the feed-screw.

The cam-shaft 106 is formed with a head 180 at one end to which is keyed by means of a spline 181 a fly-wheel 182, which by its rotation assists in securing uniform motion to the moving parts and for resisting sudden accelerations of speed by its inertia and sudden retardation by its momentum. The head 180 is coupled by means of universal joints 183 and 184 and coupling-rod 185 to a driving-spindle 186 journaled in a bearing-bracket 187 having a pinion 188 mounted thereon meshing with an index-gear 189 mounted on the change-gear shaft 190 which is journaled in roller bearings in a cylindrical casing 191, the opposite end of said change-gear shaft 190 having a pinion 192 keyed thereto meshing with a driving-gear 193 which is attached to the lugs 4 on the lathe head 3, by means of bolts 194. This cylindrical casing 191 has a segmental arm 195 extending therefrom provided with a ribbed face 196 for adjustably engaging the segmental groove 197 formed in the side face of the driving-spindle bearing bracket 187, the segmental arm 195 being secured to the driving-spindle bearing bracket 187 by means of clamps 198 and bolts 199. In order to more fully support the cylindrical casing 191 in its adjusted position a split collar 200 is clamped around the cylindrical casing and held in its adjusted position by means of a bolt 201 and an adjusting nut 202. When it is desired to change the size of the index-gear 189 the nut for retaining the same is taken off and the index-gear removed, the nuts on the bolts 199 are unscrewed slightly to release the clamping action of the clamps 198 upon the segmental arm 195, the adjusting nut 202 on bolt 201 unscrewed, a new index-gear mounted on the shaft and secured in place by the nut, the segmental arm 195 can then be rotated and adjusted so that the new index-gear will mesh with the pinion 188, the nuts on bolts 198 can then be tightened, the bolt 201 adjusted and the nut 202 screwed down tight on one of the flanges of the split collar 200.

When it is desired to increase the size of the pinion on the driving-spindle 186 to decrease the number of reciprocations of the top tool carriage block 47 for each rotation of the roll, as is the case in forming zig-zag grooves in the finishing roll passes of larger sizes this can be easily accomplished by mounting a ring-gear 203 over the pinion 188 on the driving-spindle 186 and securing it thereto by means of a key 204 as will be clearly understood by referring to Figs. 15 and 16 of the drawings.

The operation of my invention is as follows:— assuming that the parts are in the positions shown in the drawings and it is desired to cut a zig-zag groove concentric with the side wall of the roll-pass, the radius-block 147 is adjusted to allow a shim 155 to be inserted between its forward end and the flange 153 of the mast-block 148, the width of the shim being one half of the diameter of the body of the bar to be rolled or the width of the pass, this will adjust the bolt 143 an equal distance out of vertical alignment with the mast block-shaft 156. The parts are then securely clamped together by means of the nut 154 on the screw-threaded extension 151. The clamping-bolt 127 with the parts mounted thereon and engaging the slot 124 of the bracket 121 and connected to the top tool carriage block 47 thereby forming a fulcrum point therefor is then adjusted on the swinging-arm 118 to give a cross-travel for the cutting tool of approximately seven-tenths of the width of the pass by means of the roller 120 engaging the cam 110. The roll 11 being mounted as shown and continuously driven in a counter-clockwise direction when viewed from a position opposite the right hand end of the machine as illustrated in Fig. 1, with the cam-shaft 106 connected and driven also in a counter-clockwise direction through the train of gearing by means of the driving gear 193 from the lathe head 3, the tool carriage carrying the cutting tool 62 preferably having 15° side cutting edges as indicated in Fig. 28 of the drawings is then advanced toward the roll 11 by the operator rotating the hand-wheel 178 until the point of the cutting tool engages the side surface of the roll pass 12. It will be understood however that other shaped cutting tools may be used, but the one described has been found desirable for the purpose. The operator then sets the vernier gage sleeve 174 until the reading is zero as indicated in Fig. 4 of the drawings. It will be noted by referring to the drawings that the top tool carriage block 47 with the parts mounted thereon is in its central position and is being advanced on the slide-way 45 from left to right to cut the inclined groove in the same direction by the movement of the roll, the cutting tool being held with its cutting face at all times transversely to the sides of the groove being cut as indicated in Fig. 27. It will be understood however that the cutting point of the tool is always held centrally in the center of the tool holder and substantially in radial alignment with the center of the roll. At the same time the bolt 143 threaded into the ear 141 of the tool post bracket 53 and engaging the roller bearing 145 in the radius-block 146 supported by the mast-block 148 will form a pivotal point for the tool post bracket 53 and will reciprocate it transversely on the slide-way 51 for each stroke of the top tool carriage block 47 and allow the point of the cutting tool 62 to travel in the arc of a circle concentric with the wall of the roll pass 12.

During the stroke of the top carriage block 47 from left to right the slide 94 which is connected to the cutting tool holder 58 by means of the yoke 91, arm 87 and coupling-spindle 59 will remain stationary in its lower position until substantially the end of the stroke or until the top roller 103 on the slide which has been passing over the smaller concentric portion of the cam 104 engages an inclined surface between the two concentric surfaces of the cam, as the top roller 103 on the slide rides up over this inclined or sloping surface onto the concentric surface of larger diameter the cutting tool 62 will be rotated substantially 90° provided the zig-zag groove to be cut is about 45° as shown, but by adjusting the position of the bolt 80 on the grooved face 81 of the head of the coupling-spindle the amount of rotation of the cutting tool can be varied for zig-zag grooves of different inclinations. As the cam-shaft 106 continues to rotate, the cam 110 will slide the top tool carriage block 47 from right to left, while the slide 94 will remain in its raised position during the return stroke by means of the top roller 103 engaging the larger concentric portion of the cam 104 until it reaches another oppositely aligned inclined portion between the two concentric portions of the cam over which it passes rotating the cutting tool in the reverse direct on 90° or into the position it assumed before its rotation in the first instance, the roller 103 will again engage the smaller concentric portion of the cam 104 and the operation will be repeated; as above described the number of zig-zag waves for each revolution of the roll being established by the indexing gears. As an example, in the drawings the driving-gear 193 has one hundred and fifty teeth and meshes with a pinion 192 having fifteen teeth which is mounted on one end of the change-gear shaft 190, the opposite end of said change-gear shaft having an index-gear 189 with forty-two teeth mounted thereon, this index-gear meshes with a pinion 188 on the driving-spindle 186 for rotating the cam-shaft 106 and is provided with twenty teeth. With this train of gearing the cam shaft 106 with the cams 104 and 110 mounted thereon would be rotated twenty-one times for each rotation of the roll 11, thereby reciprocating the slide 94 and the top tool carriage block 47 a similar number of times. If an index-gear having fifty-four teeth is substituted for the one above mentioned with the same gearing the cam-shaft would be rotated twenty-seven times in a similar period, or if an index-gear with 66 teeth were used the cam-shaft would be rotated thirty-three times. If the same gearing is used as first described and a ring-gear 203 having thirty teeth is used over the pinion 188 as indicated in Figs. 15 and 16, the cam-shaft would be rotated fourteen times for each rotation of the roll, numerous other combinations may be made to give any number of waves to the zig-zag groove from one, to a greater number of waves than for those above mentioned, if desired.

After starting the grooving operation the roll 11 is rotated continuously until the groove is completed, when the mark 163 appears at the end of each revolution of the roll the operator advances the cutting tool against the surface of the rotating roll by means of the hand-wheel 178 thereby at the same time turning the vernier gage sleeve 174 slightly until the desired depth of the groove is reached as indicated by the vernier reading.

When it is desired to cut zig-zag grooves deeper in the center of the roll pass than at the sides a shim 155 of less than half the width radii of the roll pass is used, otherwise the operation is the same as for forming grooves concentric with the side wall of the pass. If, however, it is desired to cut a groove in a roll pass having a greater radius than the side wall as indicated by the numeral 161 in Fig. 28 a shim 155 of greater width than one half the radius or width of the roll pass is used, the operation being similar to that of cutting concentric grooves with the exception that as it is necessary for the cutting tool to cut out the sides of the pass, first the vernier gage is not set at zero until the tool has cut out enough at the sides to reach the central surface of the pass, when this occurs the vernier gage is set at zero and the grooving proceeds as for a concentric groove.

When it is desired to cut grooves in a flat pass as indicated at 162 in Fig. 26, or a roll having a smooth cylindrical face for rolling plates with designs on them for stair-treads and the like purpose the bolt 143 in the ear 141 of the tool post bracket 53 is taken out and the tool post bracket locked on the top carriage block 47. The clamping bolt 127 and parts mounted thereon and connected to the swinging arm 118 can then be adjusted to give any desired longitudinal reciprocation to the top tool carriage block 47, the cutting point of the tool will then travel in a parallel line at the side of the roll.

Although the cams 104 and 110 are adapted to form a waved or zig-zag groove, other forms of cams could be used on the same machine for cutting other shaped grooves of irregular or different outline without departing from the spirit of my invention.

The bearings and slide-ways in my machine can be quickly adjusted to take up any wear which may occur, this feature is of particular advantage as in a machine of this kind no lost motion in the several movements of the device can be tolerated.

This machine can also be easily attached to any standard machine shop engine lathe for turning rolls and the cutting tool carriage quickly adjusted when in position to operate on any pass or cylindrical surface desired by adjusting the tool carriage base 29 on the rest-bar 24 by means of the removable lugs 33 which can be inserted in the spaced sockets 31 and further adjusted by means of the bolts 35.

Although I have shown and described my invention in considerable detail, I do not wish to be limited to the exact construction specified, but may use such substitutions, modifications or equivalents thereof as are embraced within the scope of my invention as pointed out in the claims.

Having thus described my invention what I claim as new and desire to secure by Letters Patent is:

1. In a profiling machine, means for supporting and rotating the work, a tool for forming a circumferential groove in the work, means for feeding said tool into cutting engagement with the work, a rotating cam adapted for holding the cutting-tool against rotation during the major portion of the grooving operation and means reciprocated during the rotation of the work for supporting the cutting tool.

2. In a profiling machine, means for supporting and rotating the work, a tool for forming a zig-zag circumferential groove in the work, means for feeding said tool into cutting engagement with the work, means longitudinally reciprocated during the rotation of the work for supporting the cutting-tool, means for holding the cutting-tool against rotation during the reciprocation of its supporting means, and means for rotating the cutting-tool at the end of each stroke of its supporting means.

3. In a profiling machine for forming grooves, comprising means for supporting and rotating the work, reciprocating means carrying a tool adapted to be fed into cutting engagement with the side of the work operated upon, and a continuous rotating cam adapted for holding the cutting-tool against rotation during the major portion of the grooving operation and for automatically rotating the cutting-tool at the ends of the strokes of said reciprocating means.

4. In a profiling machine for forming a groove in a cylindrical surface, comprising means for supporting and rotating the work, longitudinally reciprocating means carrying a cutting-tool at the side of the work, means for holding the cutting-tool against rotation during the major portion of the grooving operation, and means for automatically rotating the cutting-tool a partial revolution at the end of each stroke of the reciprocating means.

5. In a profiling machine for forming a groove in the surface of a roll or the like, means for supporting and continuously rotating the roll during the grooving operation, longitudinally reciprocating means carrying a cutting-tool at the side of the roll in parallel relation thereto, means for feeding the tool into cutting engagement with the roll, means for holding the cutting-tool against rotation during the major portion of the grooving operation, means for automatically rotating the cutting-tool in one direction at the end of the forward stroke of the reciprocating means, and means for automatically rotating the cutting tool in the reverse direction at the end of the backward stroke of the reciprocating means.

6. In a profiling machine for forming a zig-zag groove in the surface of cylindrical work, means for supporting and continuously rotating the cylindrical work during the grooving operation, longitudinally reciprocating means carrying a cutting-tool disposed in radial alignment with the central axis of the cylindrical work and arranged to travel in parallel relation thereto, means for transversely advancing the tool into cutting engagement with the cylindrical work, means for holding the cutting-tool against rotation during the major portion of the grooving operation, means for automatically rotating the cutting-tool in one direction at the end of the forward stroke of the reciprocating means, and means for automatically rotating the cutting-tool in the reverse direction at the end of the backward stroke of the reciprocating means.

7. A profiling machine for forming grooves in rolls or the like, comprising means for supporting and rotating the roll, a tool carriage provided with an adjustable base and intermediate blocks, a top tool carriage block mounted thereon, a cutting-tool carried by the top tool carriage block, means intermittently operated for automatically reciprocating the top tool carriage block, means for holding the cutting-tool against rotation during the reciprocation of the top tool carriage block and means for automatically rotating the cutting-tool in both directions.

8. A profiling machine for forming grooves in rolls or the like, comprising a tool carriage provided with a longitudinally adjustable base block, a transversely adjustable intermediate block and a top tool carriage block mounted thereon, a cutting-tool carried by the top tool carriage block, means for supporting and rotating the roll to be grooved, means for advancing the tool into cutting engagement with the rotating roll, means for longitudinally reciprocating the top tool carriage block, means for holding the cutting-tool against rotation during the reciprocation of the top tool carriage block, means for automatically rotating the cutting-tool in one direction at the end of the forward stroke of the reciprocating top tool carriage block, means for automatically rotating the cutting-tool in the reverse direction at the end of the backward stroke of the reciprocating top tool carriage block, and means for adjusting the rotating movement of the cutting-tool.

9. A profiling machine for forming grooves in rolls or the like, comprising a tool carriage provided with an adjustable lower portion, a top tool carriage block mounted thereon, a cutting-tool carried by the top tool carriage block, means for supporting and continuously rotating the roll, automatic means for longitudinally reciprocating the top tool carriage block in a plane at the side of the roll, means for holding the cutting-tool against rotation during the longitudinal reciprocation of the top tool carriage block, means for adjusting the stroke of the top tool carriage block, means for automatically rotating the cutting-tool in one direction at the end of the forward stroke of the reciprocating top tool carriage block, means for automatically rotating the cutting-tool in the reverse direction at the end of the backward stroke of the reciprocating top tool carriage block, and means for adjusting the rotating movement of the cutting-tool in timed relation with the reciprocating top tool carriage block.

10. A profiling machine for forming zig-zag grooves in rolls or the like, comprising a tool carriage provided with longitudinally and transversely adjustable lower portions, a top tool carriage block mounted thereon, means for supporting and continuously rotating the roll, a cutting-tool carried by the top tool carriage block disposed in radial alignment with the central axis of the roll, automatic means for longitudinally reciprocating the top tool carriage block in a horizontal plane at the side of the roll, means for adjusting the stroke of the top tool carriage block, automatic means for rotating the cutting-tool in one direction at the end of each forward stroke of the reciprocating top tool carriage block, automatic means for rotating the cutting-tool in the reverse direction at the end of each backward stroke of the reciprocating top tool carriage block, means for adjusting the rotating movement of the cutting-tool in timed relation with the reciprocating top tool carriage block, and means for feeding the cutting-tool transversely into cutting engagement with the rotating roll.

11. In a profiling machine for forming circumferential grooves in the surface of a cylindrical roll or the like, means for supporting and rotating the roll, longitudinally reciprocating means carrying a cutting-tool at the side of the roll, means for automatically rotating the cutting-tool in timed relation with the longitudinally reciprocating means, and means reciprocating transversely of the roll adapted to move the cutting-tool in an arcuate path during each stroke of the longitudinally reciprocating means.

12. A profiling machine for forming grooves in rolls or the like, comprising a tool carriage provided with longitudinally and transversely adjustable lower portions, a top tool carriage block mounted thereon, a tool post bracket mounted on the top tool carriage block, a cutting-tool rotatably mounted in the tool post bracket, means for supporting and rotating the roll, automatic means for longitudinally reciprocating the top tool carriage block in a plane at the side of the roll, and automatic means for reciprocating the tool post bracket transversely of the roll during the longitudinal reciprocation of the top tool carriage block.

13. A profiling machine for forming grooves in rolls or the like, comprising a tool carriage provided with an adjustable lower portion, a top tool carriage block slidably mounted thereon, a tool post bracket mounted on the top tool carriage block, a cutting-tool rotatably mounted in the tool post bracket, means for continuously rotating the roll during the grooving operation, automatic means for longitudinally reciprocating the top tool carriage block in a plane at the side of the road, automatic means for rotating the cutting-tool in opposite directions, and automatic means for reciprocating the tool post bracket transversely of the roll during the longitudinal reciprocation of the top tool carriage block.

14. A profiling machine for forming zig-zag grooves in roll passes or the like, comprising a tool carriage provided with an adjustable lower portion, a top tool carriage block slidably mounted thereon, a tool post bracket mounted on the top tool carriage block, a cutting-tool rotatably mounted in the tool post bracket, means for supporting and rotating the roll, automatic means for longitudinally reciprocating the top tool carriage block in a plane at the side of the roll, means for adjusting the longitudinal stroke of the top tool carriage block, means for rotating the cutting-tool at the end of each stroke of the top tool carriage block, means for reciprocating the tool post bracket on the top tool carriage block transversely of the roll during the longitudinal reciprocation of the top tool carriage block, and means for adjusting the reciprocating stroke of the tool post bracket.

15. A profiling machine for forming zig-zag grooves in roll passes or the like, comprising a tool carriage provided with a relatively stationary lower portion, a top tool carriage block reciprocally mounted thereon, a tool post bracket mounted on the top tool carriage block, a cutting-tool carried by the tool post bracket, means for supporting and rotating the roll, automatic means for longitudinally reciprocating the top tool carriage block in a horizontal plane at the side of the roll, means for adjusting the longitudinal stroke of the tool carriage block, automatic means for rotating the cutting-tool in one direction at the end of each forward stroke of the reciprocating top tool carriage block, automatic means for rotating the cutting-tool in the reverse direction at the end of each backward stroke of the reciprocating top tool carriage block, means for adjusting the rotating movement of the cutting-tool in timed relation with the reciprocating top tool carriage block, means for reciprocating the tool post bracket transversely of the roll during the longitudinal reciprocation of the top tool carriage block, and means for adjusting the reciprocating stroke of the tool post bracket.

16. A profiling machine for forming zig-zag grooves in roll passes or the like, comprising a tool carriage, a cam-shaft journaled in the tool carriage, means for rotating the cam-shaft, a top tool carriage block, a tool post bracket mounted on the top tool carriage block, a cutting-tool carried by the tool post bracket, means for supporting and rotating the roll, a cam on the cam-shaft for longitudinally reciprocating the top tool carriage block on a horizontal plane at the side of the roll, means pivoted to the tool post bracket for transversely reciprocating the same on the top tool carriage block at the side of the roll, and means for advancing the cutting-tool into engagement with the rotating roll.

17. A profiling machine for forming zig-zag grooves in cylindrical rolls or the like, comprising a tool carriage, a cam-shaft journaled in the tool carriage, a top tool carriage block, a tool post bracket mounted on the top tool carriage block, a cutting-tool carried by the tool post bracket, means for supporting and rotating the roll during the grooving operation, means for rotating the cam-shaft, means for changing the number of rotations of the cam-shaft in relation to the roll, a cam on the cam-shaft for longitudinally reciprocating the top tool carriage block on a horizontal plane at the side of the roll, means for adjusting the reciprocating stroke of the top tool carriage block, pivotal means for reciprocating the tool post bracket on the top tool carriage block transversely of the roll during the reciprocation of the said top tool carriage block, means for adjusting the reciprocating stroke of the tool post bracket means for reversing the face of the cutting-tool at the end of each stroke of the reciprocating top carriage block, and means for advancing the cutting-tool into engagement with the rotating roll.

18. A profiling machine for forming zig-zag grooves in cylindrical rolls or the like, comprising a tool carriage having a longitudinally adjustable base block, a transversely adjustable intermediate block with a longitudinally reciprocating top tool carriage block mounted thereon, a transverse slide-way formed on the upper surface of the tool carriage block, a tool post bracket mounted on the slide-way, a cutting-tool carried by the tool post bracket, a cam-shaft journaled in the intermediate tool carriage block, means for rotating the cam-shaft, a cam on the cam-shaft for longitudinally reciprocating the top carriage block, a cam on the cam-shaft for rotating the cutting-tool, and means independent of the cam-shaft for transversely reciprocating the tool post bracket during the reciprocation of the top tool carriage block.

19. A profiling machine for forming zig-zag grooves in rolls or the like, comprising a tool carriage having a longitudinally adjustable base block, a transverse slideway formed thereon, a transversely adjustable intermediate tool carriage block mounted on the slide-way of the base block provided with a longitudinal slide-way on its upper face, a top tool carriage block mounted on the longitudinal slide-way of the intermediate block, a transverse slide-way formed on the top tool carriage block, a tool post bracket mounted on the transverse slide-way of the top tool carriage block, a cutting-tool carried by the tool post bracket, means for adjusting the slide-ways of the tool carriage, means for longitudinally reciprocating the top tool carriage block, means pivoted to the tool post bracket for imparting transversely reciprocating movement thereto during the longitudinal reciprocation of the top tool carriage block, means for rotating the cutting-tool in one direction at the end of each forward stroke of the top tool carriage block, and means for rotating the cutting-tool in the reverse direction at the end of each backward stroke of the top tool carriage block.

20. A profiling machine for forming grooves in rolls or the like, comprising means for supporting and rotating the roll, a tool carriage, a cutting-tool carried by the tool carriage, means for advancing the tool into cutting engagement with the rotating roll, means intermittently operated for automatically rotating the cutting tool, and means for simultaneously imparting a longitudinal and transverse movement to the cutting-tool.

21. A profiling machine for forming grooves in rolls or the like, comprising means for supporting and rotating the roll, a tool carriage, a cutting-tool carried by the tool carriage, means for advancing the tool into cutting engagement with the rotating rolls, means intermittently operated for automatically rotating the cutting tool, means for simultaneously imparting a longitudinal and transverse movement to the cutting-tool, and means for adjusting the longitudinal and transverse movement of the cutting-tool.

22. A profiling machine for forming zig-zag grooves in rolls or the like, comprising means for supporting and rotating the roll, a tool carriage, a cutting-tool carried by the tool carriage, means for advancing the tool into cutting engagement with the rotating roll, means for simultaneously imparting a longitudinal and transverse movement to the tool during the cutting operation, means for adjusting the longitudinal and transverse movement of the cutting-tool, means for rotating the cutting-tool, and means for adjusting the rotation of the cutting-tool.

23. A profiling machine for forming zig-zag grooves in rolls or the like, comprising means for supporting and rotating the roll, a tool carriage, a cutting-tool carried by the tool carriage, means for advancing the tool into cutting engagement with the rotating roll, means for simultaneously imparting a reciprocating longitudinal and transverse movement to the cutting-tool during the cutting operation, means for adjusting the reciprocating stroke of the longitudinal and transverse movement of the cutting-tool, means for rotating the cutting tool in both directions, and means for adjusting the rotation of the cutting-tool.

24. A profiling machine for forming zig-zag grooves in rolls or the like, the combination with a lathe, a lathe bed, housings mounted on the lathe bed, bearings formed on the housings for supporting the roll, a rest-bar mounted on the housings, a tool carriage adjustable longitudinally on the rest-bar, a cutting-tool carried by the tool carriage, a cam-shaft journaled in the tool carriage, means for rotating the roll and cam-shaft in timed relation to each other from the lathe, a cam on the cam-shaft for imparting a lateral movement to the cutting-tool, and independent means for imparting a longitudinal movement to the cutting-tool.

25. A profiling machine for forming zig-zag grooves in rolls or the like, the combination with a lathe, a lathe bed, housings mounted on the lathe bed, bearings formed on the housings for supporting the roll, a rest-bar mounted on the housings, a tool carriage adjustable longitudinally on the rest-bar, a cutting-tool carried by the tool carriage, a cam-shaft journaled in the tool carriage, a lathe head having means connected therewith for rotating the roll and cam-shaft together in timed relation, means for changing the number of rotations of the cam-shaft in relation to the roll, a cam on the cam-shaft for imparting a lateral movement to the cutting-tool, independent means for imparting a longitudinal movement to the cutting-tool, and means for feeding the cutting-tool.

26. In a machine of the character described, a bed, housings mounted on the bed, journal bearings formed on the housings adapted to support a roll, a driven shaft carrying a chuck adapted to rotate the roll, a tool carriage supported on the housings, a cutting-tool carried by the tool carriage adapted to form a zig-zag groove in the roll, means for holding the cutting face of the tool in transverse alignment with the sides of the groove, and means for imparting a longitudinal and transverse movement to the cutting-tool in relation to the roll.

27. In a machine of the character described, a bed, housings mounted on the bed, journal bearings formed on the housings adapted to support a roll, a driven shaft carrying a chuck adapted to rotate the roll, a rest-bar supported on the housings, a tool carriage mounted on the rest-bar, a top tool carriage block, a tool post bracket mounted on the top tool carriage block, a tool holder having a cutting-tool secured thereto mounted in the tool post bracket, means for longitudinally reciprocating the top tool carriage block, and a pivoted radius-block for imparting a transversely reciprocating movement to the tool post bracket.

28. In a machine of the character described, a bed, housings mounted on the bed, journal bearings formed on the housings adapted to support a roll, a driven shaft carrying a chuck adapted to rotate the roll, a rest-bar supported on the housings, a tool carriage mounted on the rest-bar having a relatively stationary base and intermediate blocks, a top tool carriage block, a tool post bracket mounted on the top tool carriage block, a tool holder having a cutting-tool secured thereto mounted in the tool post bracket, a cam-shaft journaled in the intermediate tool carriage block, means for rotating the cam-shaft, a cam mounted on the cam-shaft for reciprocating the top tool carriage block for carrying the cutting-tool longitudinally of the roll, pivoted means for reciprocating the tool post bracket carrying the cutting-tool transversely of the roll, and means to feed the cutting-tool inward toward the central axis of the roll.

29. In a profiling machine for forming zig-zag grooves in rolls or the like, comprising means for supporting and rotating the roll, a tool carriage provided with a top tool carriage block, a tool post bracket mounted on the top tool carriage block, a cutting tool carried by the tool post bracket, means for longitudinally reciprocating the top tool carriage block, and means for transversely reciprocating the tool post bracket adapted to give the cutting-tool an arcuate path.

30. In a machine of the character described, a tool carrige provided with relatively stationary base and intermediate blocks, a top tool carriage block mounted thereon, a tool post bracket mounted on the top tool carriage block, a cutting-tool carried by the tool post bracket, means for longitudinally reciprocating the top tool carriage block, means for transversely reciprocating the tool post bracket simultaneously with the reciprocation of the top tool carriage block, and means for rotating the cutting-tool at the end of the reciprocating strokes of the top tool carriage block and tool post bracket.

31. In a machine of the character described, a tool carriage provided with relatively stationary tool carriage portions, a reciprocating top tool carriage block mounted thereon, a tool post bracket mounted on the top tool carriage block, a cutting-tool carried by the tool post bracket, a cam-shaft journaled in the tool carriage, means for rotating the cam-shaft, a cam mounted on the cam-shaft for longitudinally reciprocating the top tool carriage block, pivoted means connected to the tool post bracket for transversely reciprocating the tool post bracket simultaneously with the reciprocation of the top tool carriage block, and means for rotating the cutting-tool in both directions.

32. In a machine of the character described, a tool carriage provided with relatively stationary tool carriage portions, a reciprocating top tool carriage block mounted thereon, a tool post bracket mounted on the top tool carriage block, a tool holder provided with a cutting-tool journaled in the tool post bracket, a coupling-spindle connected to the tool holder and journaled in the tool post bracket, a cam-shaft journaled in the tool carriage, means for rotating the cam-shaft, a cam on the cam-shaft for longitudinally reciprocating the top tool carriage block, means pivotally connected to the tool post bracket for transversely reciprocating the tool post bracket simultaneously with the reciprocation of the top tool carriage block, a slide-way formed in the tool carriage, a slide mounted therein, a connection between the slide and the coupling-spindle, and a cam on the cam-shaft for reciprocating the slide to rotate the cutting-tool in one direction at the end of each forward stroke of the top tool carriage block and for rotating the cutting-tool in the reverse direction at the end of each backward stroke of the said top tool carriage block.

33. In a machine of the character described, a tool carriage provided with relatively stationary tool carriage portions, a top tool carriage block mounted thereon, means for longitudinally reciprocating the top tool carriage block, a tool post bracket mounted on the top tool carriage block, means for transversely reciprocating the tool post bracket simultaneously with the top tool carriage block, a tool holder provided with a cutting-tool journaled in the tool post bracket, a coupling-spindle connected to the tool holder and journaled in the tool post bracket, a cam-shaft journaled in the tool carriage, means for rotating the cam-shaft, a reciprocating slide mounted in the tool carriage, a connection between the slide and the coupling-spindle, a cam on the cam-shaft for reciprocating the slide to rotate the cutting-tool at the end of each of the strokes in one direction and for rotating the cutting-tool in the reverse direction at the end of each of the strokes of the slide in the opposite direction, and means for adjusting the rotation of the cutting-tool.

34. In a machine of the character described, a tool carriage provided with relatively stationary tool carriage portions, a top tool carriage block mounted thereon, means for longitudinally reciprocating the top tool carriage block, a tool post bracket mounted on the top tool carriage block, rotatably mounted pivotal means for transversely reciprocating the tool post bracket simultaneously with the top tool carriage block, a tool holder provided with a cutting-tool journaled in the tool post bracket, a coupling-spindle connected to the tool holder and journaled in the tool post bracket, said coupling-spindle having a dovetailed slot and groove formed in its outer face, a bolt having its head adjustably engaging the dovetailed slot, a sleeve mounted on the bolt having a rectangular flanged end engaging the grooved face of the coupling-spindle, an eye-bolt rotatably mounted on the sleeve, a cam-shaft journaled in the tool carriage, means for rotating the cam-shaft, a reciprocating slide mounted in the tool carriage, a yoke pivoted to the slide, an arm having one end pivoted to the yoke and its opposite end pivoted on the eye-bolt, a cam on the cam-shaft for reciprocating the slide and adapted to rotate the cutting-tool a partial revolution in both directions for each reciprocation of the slide, and means for adjusting the rotary movement of the cutting-tool.

35. In a machine of the character described, a tool carriage provided with relatively stationary lower and intermediate portions, a longitudinally reciprocating top tool carriage block mounted thereon, a transversely reciprocating tool post bracket mounted on the top tool carriage block and reciprocated by the movement thereof, a tool holder provided with a cutting-tool journaled in the tool post bracket, a coupling-spindle connected to the tool holder, and journaled in the tool post bracket, a cam-shaft journaled in the tool carriage, means for rotating the cam-shaft, a reciprocating slide mounted in the tool carriage, a universal connection between the slide and the coupling-spindle, a cam on the cam-shaft for reciprocating the slide and adapted to rotate the cutting-tool a partial revolution in both directions for each reciprocation of the slide, and means for adjusting the rotary movement of the cutting-tool.

36. In a machine of the character described, a tool carriage provided with relatively stationary lower and intermediate portions, a top tool carriage block mounted thereon, means for longitudinally reciprocating the top tool carriage block, a tool post bracket mounted on the top tool carriage block, means for transversely reciprocating the tool post bracket simultaneously with the top tool carriage block, a tool holder provided with a cutting-tool journaled in the tool post bracket, means for adjusting the journal bearing for the tool holder, a coupling-spindle connected to the tool holder journaled in the tool post bracket, means for adjusting the journal bearing for the coupling-spindle, a cam-shaft journaled in the tool carriage, means for rotating the cam-shaft, a reciprocating slide mounted in the tool carriage, a yoke having a shaft journaled in bearings mounted in the slide, means for adjusting the journal bearings for the shaft of the yoke, an arm having one end formed with pin extensions journaled in bearings mounted in the yoke, means for adjusting the bearings for the pin extensions, a universal connection for attaching the opposite end of the arm to the coupling-spindle, a cam on the cam-shaft for reciprocating the slide and adapted to rotate the cutting-tool a partial revolution in both directions for each reciprocation of the slide and means for adjusting the rotary movement of the cutting-tool.

37. In a machine of the character described, a tool carriage provided with relatively stationary base and intermediate blocks, a top tool carriage block mounted on the intermediate block, a bracket attached to the top tool carriage block, a tool post bracket mounted on the top tool carriage block, a tool holder having a cutting-tool secured thereto rotatably mounted in the tool post bracket, a cam-shaft journaled in the intermediate tool carriage block, means for rotating the cam-shaft, a cam on the cam-shaft, a swinging-arm pivotally connected to the intermediate relatively stationary block of the tool carriage, a fulcrum connection between the swinging-arm and the bracket attached to the top tool carriage block, a stud-pin secured to the swinging arm, a roller mounted on the stud-pin for engaging the cam on the cam-shaft for longitudinally reciprocating the top tool carriage block, and pivotal means for transversely reciprocating the tool post bracket.

38. In a machine of the character described, a tool carriage provided with relatively stationary base and intermediate blocks, a top tool carriage block mounted thereon, a bracket attached to the top tool carriage block, a slide-way formed in the bracket, a tool post bracket mounted on the top tool carriage block, a tool holder having a cutting-tool secured thereto rotatably mounted in the tool post bracket, a cam-shaft journaled in the tool carriage, means for rotating the cam-shaft, a cam mounted on the cam-shaft, a swinging arm having one end pivotally connected to the relatively stationary intermediate tool carriage block, a fulcrum connection between the swinging-arm provided with wedge-blocks slidably engaging the slide-way formed in the bracket attached to the top tool carriage block, a stud-pin secured to the swinging arm, a roller mounted on the stud-pin for engaging the cam on the cam-shaft for longitudinally reciprocating the top tool carriage block, means for adjusting the fulcrum connection between the swinging-arm and the bracket whereby the stroke of the reciprocating top tool carriage block is adjusted, and means pivoted to the tool post bracket for transversely reciprocating the tool post bracket simultaneously with the top tool carriage block.

39. In a machine of the character described, a tool carriage provided with relatively stationary base and intermediate blocks, a top tool carriage block mounted thereon, a cutting-tool laterally movable with the top tool carriage block, a bracket attached to the top tool carriage block, a slot formed in the bracket, a cam-shaft journaled in the intermediate tool carriage block, a cam mounted on the cam-shaft, means for rotating the cam-shaft, a swinging-arm pivotally attached at one end to the relatively stationary intermediate tool carriage block, a slide-way formed in the swinging-arm, a clamping-bolt having its head seated in the slide-way with its shank projecting outwardly through the slot formed in the bracket, bearing blocks mounted on the clamping-bolt, wedge-blocks engaging the bearing-blocks and slidably engaging the sides of the slot formed in the bracket, means for adjusting the clamping-bolt on the swinging-arm, a stud-pin secured to the swinging-arm, a roller mounted on the stud-pin for engaging the cam adapted to longitudinally reciprocate the top tool carriage block, and means for rotating the cutting-tool.

40. In a machine of the character described, a tool carriage provided with relatively stationary base and intermediate tool carriage blocks, a top tool carriage block mounted thereon, a cutting-tool laterally movable with the top tool carriage block, a swinging-arm pivotally attached at one end to the tool carriage, an adjustable fulcrum connection between the swinging-arm and the top tool carriage block, means for actuating the swinging-arm to reciprocate the top tool carriage block, and means for rotating the cutting-tool.

41. In a machine of the character described, a tool carriage provided with relatively stationary base and intermediate tool carriage blocks, a top tool carriage block mounted thereon, a cutting-tool laterally movable with the top tool carriage block, a bracket attached to the top tool carriage block, a slot formed in the bracket, a cam-shaft journaled in the tool carriage, a cam mounted on the cam-shaft, means for rotating the cam-shaft, a swinging-arm pivotally attached at one end to the relatively stationary intermediate tool carriage block, a slide-way formed centrally in the swinging-arm, a clamping-bolt having its shank projecting outwardly through the slot formed in the bracket, a slide-way formed in the face of the swinging-arm, a sleeve mounted on the shank of the clamping-bolt in the slot of the bracket having a rectangular flanged end engaging the slide-way in the face of the swinging-arm, bearing blocks having arc-shaped inner faces engaging opposite sides of the sleeve, wedge-blocks engaging the bearing-blocks and sides of the slot formed in the bracket, a groove and rib connection between the wedge-blocks and the bearing-blocks, means for adjusting the wedge-blocks in relation to the bearing-blocks, means for adjusting the clamping-bolt on the swinging-arm, means for actuating the swinging arm to longitudinally reciprocate the top tool carriage block, and means for rotating the cutting-tool.

42. In a machine of the character described, a tool carriage provided with relatively stationary base and intermediate blocks, a top tool carriage block mounted thereon, a cutting-tool laterally movable with the top tool carriage block, a bracket attached to the top tool carriage block, a slot formed in the bracket, a cam-shaft journaled in the intermediate tool carriage block, a cam mounted on the cam-shaft, means for rotating the cam-shaft, a swinging-arm pivotally attached at one end to the intermediate tool carriage block, slide-ways formed in the swinging-arm, a fulcrum connection secured in the slide-ways of the swinging-arm and the slot formed in the bracket, adjustable wedge-blocks for the fulcrum connection slidably engaging the slot formed in the bracket, means for adjusting the fulcrum connection on the swinging-arm, a roller attached to the swinging-arm adapted to engage the cam to reciprocate the top tool carriage block, and means for rotating the cutting-tool in both directions.

43. In a machine of the character described, a tool carriage provided with relatively stationary base and intermediate blocks, means for longitudinally adjusting the base tool carriage block, means for transversely adjusting the intermediate tool carriage block, a top tool carriage block mounted on the intermediate tool carriage block, a cutting-tool movable with the top carriage block, a bracket attached to the top tool carriage block, a swinging-arm pivotally attached at one end to the intermediate tool carriage block, an adjustable fulcrum point connection between the swinging-arm and the bracket, means for actuating the swinging-arm to longitudinally reciprocate the top tool carriage block, and means for rotating the cutting-tool at the end of each of the reciprocating strokes of the top tool carriage block.

44. In a machine of the character described, a tool carriage provided with relatively stationary base and intermediate blocks, a top tool carriage block mounted thereon, a tool post bracket mounted on the top tool carriage block, a cutting-tool carried by the tool post bracket, a mast-block rotatably mounted on the tool carriage, a radius-block secured to the mast-block and pivoted to the tool post bracket, means for longitudinally reciprocating the top tool carriage block thereby imparting a transversely reciprocating movement to the tool post bracket.

45. In a machine of the character described, a tool carriage provided with relatively stationary base and intermediate blocks, a top tool carriage block mounted thereon, a tool post bracket mounted on the top tool carriage block, a cutting-tool carried by the tool post bracket, a mast-block having a flange at its forward end rotatably mounted and supported by the intermediate tool carriage block, a radius-block mounted in the mast-block, means for adjusting the radius-block in the mast-block, a shim between the end of the radius-block and the flange of the mast-block, means for pivoting the radius-block to the tool post bracket, means for longitudinally reciprocating the top tool carriage block thereby imparting a transversely reciprocating movement to the tool post bracket by means of its pivotal attachment to the radius-block, and means for rotating the cutting-tool in both directions.

46. In a machine of the character described, a tool carriage provided with relatively stationary base and intermediate blocks, a top tool carriage block mounted thereon, a tool post bracket mounted on the top tool carriage block, a cutting-tool carried by the tool post bracket, a mast-block provided with a shaft journaled in adjustable bearings mounted in a bracket and secured to the tool carriage, said mast-block having grooved side flanges and a front flanged face formed with a perforation, a radius-block mounted in the mast-block and adjustably engaging the grooved sides, a screw-threaded extension on the radius-block extending through the perforation in the flanged face of the mast-block, a bearing seated in a socket formed in the radius-block, an ear extending forwardly from the tool post bracket, a bolt threaded into the ear and engaging the bearing seated in the radius-block, and forming a pivotal point therefor, a shim between the front end of the radius-block and the front flange of the mast-block, a nut on the screw-threaded extension of the radius-block adapted to hold the bolt in the ear of the tool post bracket out of vertical alignment with the shaft of the mast-block, means for longitudinally reciprocating the top tool carriage block thereby imparting a transversely reciprocating movement to the tool post bracket by means of its pivotal attachment to the radius-block, and means for rotating the cutting-tool in both directions.

47. In an attachment for a lathe or the like, a rotating head provided with a chuck, a bed, housings mounted on the bed, journal bearings formed on the housings, a roll mounted in the journal bearings, a connection between the roll and the chuck, a tool carriage provided with a relatively stationary base and intermediate blocks, a top tool carriage block mounted thereon, a tool post bracket mounted on the top tool carriage block, a cutting-tool carried by the tool post bracket, a cam-shaft journaled in the intermediate tool carriage block, gearing connected to the head for rotating the cam-shaft in timed relation with the roll, a cam mounted on the cam-shaft for longitudinally reciprocating the top tool carriage block, means pivoted to the tool post bracket for transversely reciprocating the tool post bracket, and means for rotating the cutting-tool in both directions.

48. In a profiling attachment for a lathe or the like, a bed, housings mounted on the bed, journal bearings formed on the housings, a roll mounted in the journal bearings, a rest-bar supported on the housings, a tool carriage mounted on the rest-bar provided with relatively stationary base and intermediate blocks, a top tool carriage block mounted on the intermediate block, a tool post bracket mounted on the top tool carriage block, a cutting-tool carried by the tool post bracket, means for longitudinally reciprocating the top tool carriage block, pivoted means for transversely reciprocating the tool post bracket simultaneously with the top tool carriage block, means for rotating the cutting-tool in one direction at the end of the forward stroke of the top tool carriage block, and means for rotating the cutting-tool in the reverse direction at the end of the backward stroke of the top tool carriage block.

49. In a profiling attachment for a lathe, a bed, housings provided with journal bearings mounted on the bed, a roll journaled in the bearings and adapted to be rotated by the lathe, a rest-bar supported on the housings, a tool carriage mounted on the rest-bar having adjustable base and intermediate blocks, a top tool carriage block mounted thereon, a tool post bracket mounted on the top tool carriage block, a cutting-tool carried thereby, a cam-shaft journaled in the intermediate tool carriage block adapted to be rotated by the lathe, a cam on the cam-shaft adapted to longitudinally reciprocate the top tool carriage block, means pivoted to the tool post bracket for transversely reciprocating the same simultaneously with the top tool carriage block, and means for controlling the number of rotations of the cam-shaft in relation to the roll.

50. In a profiling attachment for a lathe, a rotating lathe head provided with a chuck, a bed, housings provided with journal bearings mounted on the bed, a roll journaled in the bearings having a coupling connection with the chuck and adapted to be rotated by the head, a rest-bar supported on the housings, a tool carriage mounted on the rest-bar provided with adjustable base and intermediate blocks, a top tool carriage block mounted thereon, a cutting-tool carried by the top tool carriage block, a cam-shaft journaled in the intermediate tool carriage block, a driving-gear attached to the lathe head, a bearing bracket mounted on the bed provided with a segmental grooved face, a segmental arm provided with a rib adjustably engaging the grooved face of bearing bracket, means for holding the segmental arm in its adjusted position, a cylindrical casing formed integral with the segmental arm, a change gear shaft journaled in the casing, a pinion on the change gear shaft meshing with the driving gear, a driving-spindle journaled in the bearing bracket, a pinion on the driving-spindle meshing with an index-gear on the change gear shaft, a connection between the driving-spindle and the cam-shaft, and a cam on the cam-shaft adapted to longitudinally reciprocate the top tool carriage block.

51. In a profiling attachment for a lathe, a rotating lathe head provided with a chuck, a bed, housings provided with journal bearings mounted on the bed, a roll journaled in the bearings having a coupling connection with the chuck and adapted to be rotated by the head, a rest-bar supported on the housings, a tool carriage mounted on the rest-bar provided with relatively stationary base and intermediate blocks, a top tool carriage block mounted thereon, a tool post bracket mounted on the top tool carriage block, a cutting-tool carried thereby, a cam-shaft journaled in the intermediate tool carriage block, a driving-gear attached to the lathe head, a bearing-bracket mounted on the bed provided with a segmental grooved face, a segmental arm provided with a rib adapted to adjustably engage the grooved face of the bearing-bracket, means for holding the segmental arm in its adjusted position, a cylindrical casing formed integral with the segmental arm, a change gear shaft journaled in the casing, a pinion on the change gear shaft meshing with the driving-gear, a driving-spindle journaled in the bearing bracket, a pinion on the driving-spindle meshing with an index-gear on the change gear shaft for controlling the number of rotations of said shaft in relation to the roll, a connection between the driving-spindle and the cam-shaft, a cam on the cam-shaft adapted to longitudinally reciprocate the top tool carriage block, and means pivoted to the tool post bracket for transversely reciprocating the tool post bracket simultaneously with the top tool carriage block.

52. In a profiling attachment for a lathe, a rotating lathe head provided with a chuck, a bed, housings provided with journal bearings mounted on the bed, a roll journaled in the bearings having a coupling connection with the chuck and adapted to be rotated by the head, a rest-bar supported on the housings, a tool carriage mounted on the rest-bar having a relatively stationary base and intermediate blocks, a top tool carriage block mounted on the intermediate block, a tool post bracket mounted on the top tool carriage block, a cam-shaft journaled in the intermediate block, a driving-gear mounted on the lathe head, a bearing-bracket mounted on the bed, a change-gear shaft journaled in a bearing adjustably mounted on the bearing-bracket, a pinion mounted on the driving-spindle, a ring-gear mounted over the pinion on the driving-spindle and secured thereto, a pinion mounted on the change-gear shaft and meshing with the driving-gear, an index-gear on the change-gear shaft meshing with the ring-gear on the driving-spindle adapted to control the number of rotations of the cam-shaft in relation to the roll, means for changing the sizes of the index-gears, a cam on the cam-shaft for longitudinally reciprocating the top tool carriage block, means pivoted to the tool post bracket for transversely reciprocating the same during the reciprocation of the top tool carriage block, means for adjusting the stroke of the top tool carriage block, and means for adjusting the stroke of the tool post bracket.

HARRY R. GEER.

CERTIFICATE OF CORRECTION.

Patent No. 2,010,662.  August 6, 1935.

HARRY R. GEER.

It is hereby certified that error appears in the printed specification of the above numbered patent requiring correction as follows: Page 2, first column, line 6, for "form" read forms; page 4, second column, line 26, for "is" first occurrence read its; page 6, second column, line 55, claim 7, strike out the words "intermittently operated" and insert the same after "means" in line 59, of said claim; and that the said Letters Patent should be read with these corrections therein that the same may conform to the record of the case in the Patent Office.

Signed and sealed this 17th day of September, A. D. 1935.

(Seal)

Leslie Frazer
Acting Commissioner of Patents.